United States Patent [19]

Capowski et al.

[11] 4,115,854

[45] Sep. 19, 1978

[54] CHANNEL BUS CONTROLLER

[75] Inventors: Robert S. Capowski, Verbank; Lewis W. Wright, Hopewell Junction; Terrence K. Zimmerman, Red Hook, all of N.Y.

[73] Assignee: International Business Machines Corporation, Armonk, N.Y.

[21] Appl. No.: 781,895

[22] Filed: Mar. 28, 1977

[51] Int. Cl.² .............................................. G06F 9/00
[52] U.S. Cl. .................................................. 364/200
[58] Field of Search ... 364/200 MS File, 900 MS File

[56] References Cited

U.S. PATENT DOCUMENTS

| 3,699,530 | 10/1972 | Capowski et al. | 340/172.5 |
| 3,702,462 | 11/1972 | Ewgland | 340/172.5 |
| 3,976,477 | 8/1976 | Porter et al. | 340/172.5 |
| 4,017,839 | 4/1977 | Calle et al. | 340/172.5 |

Primary Examiner—Gareth D. Shaw
Assistant Examiner—C. T. Bartz
Attorney, Agent, or Firm—Robert Lieber

[57] ABSTRACT

The Channel Bus Controller (CBC) transfers information between groups of input/output channels and processor storage. Storage receives or dispenses two data words per access operation. Interfaces for transfers from the channel groups to the CBC are advantageously one word wide; since each output (fetch) request consists of a single request word. Information sent by each group is assembled into three-word units (a request word and zero, one or two data words) in a respective channel bus assembly register (CBAR). The assembled unit is passed from the CBAR to a respective area of an In Buffer array and from that array to storage. Zero filler words are inserted into unused data word positions. A channel request may be tagged to designate a transfer of four data words. If the transfer is an input the four data words are sent to the CBC with a single request word. The third and fourth data words are written in the CBAR over the first and second data words as (or after) the unit formed by the request and first and second data words is advanced to the In Buffer. The same request and the third and fourth data words are transferred as a second unit from the CBAR to the In Buffer. The low order bit in the address part of the request is inverted by the CBC to designate the "next" storage address. This saves time by eliminating a request unit transfer from the source channel group. Request transfers from a group are permitted when a vacancy exists either in the respective CBAR or in a respective area of the In Buffer. Outputs from storage (acknowledgments of data inputs and fetched/output data) are returned to the respective channel group via a respective area of an Out Buffer array. Returns to a group are ordered in the input sequence of respective requests to the CBC although the requests may be applied to storage in another sequence. Tags generated by the CBC are used to maintain the correct output order without delaying evacuation of the In Buffer. The area partitioning of the in and out buffer arrays provides balanced group access to storage and simplifies handling of group traffic. Channel identity information in the request words is looped through the buffer arrays and returned to the channel groups with respective outputs. This permits the CBC (and storage) to ignore channel origins of group traffic and thereby further simplifies handling of traffic.

12 Claims, 22 Drawing Figures

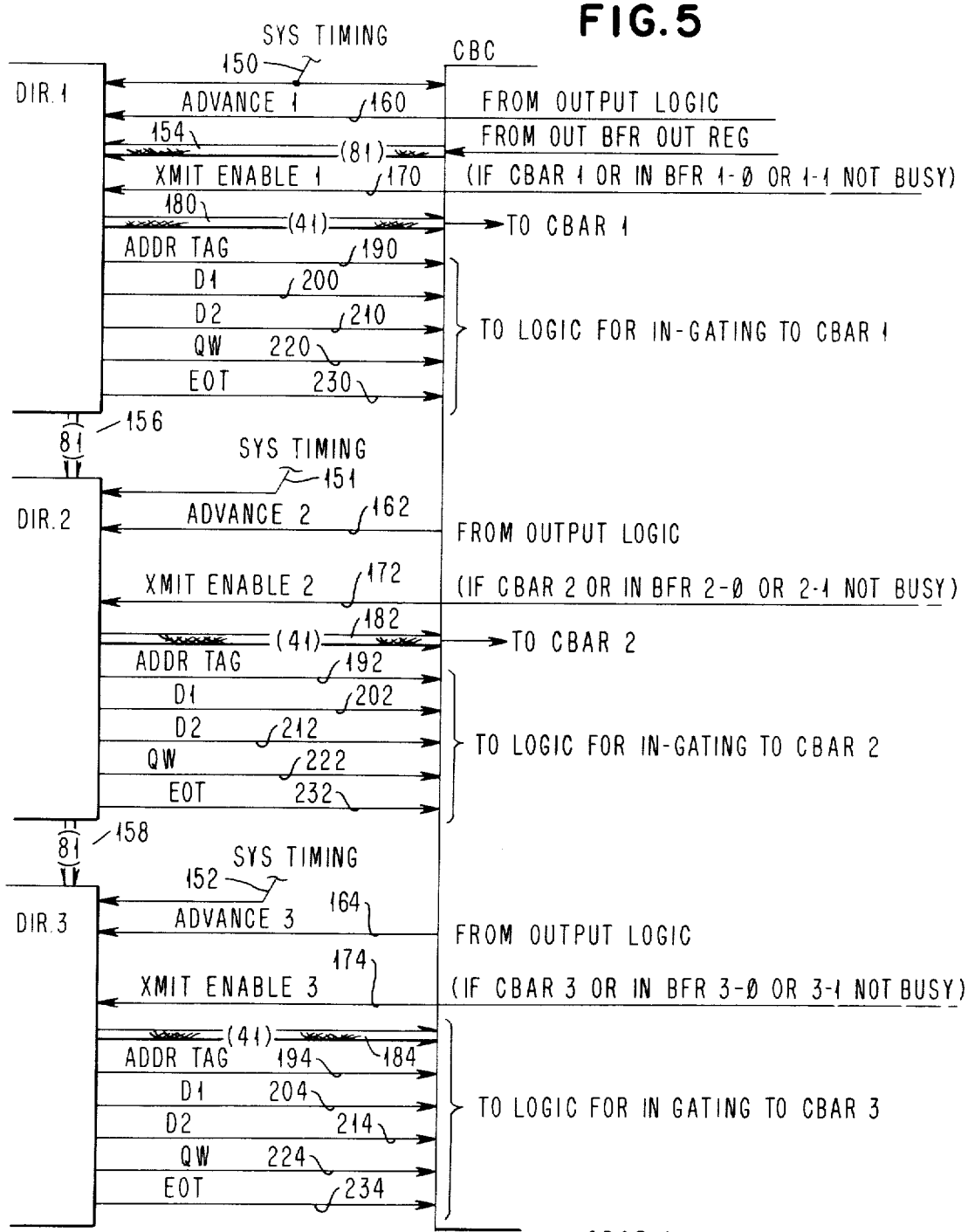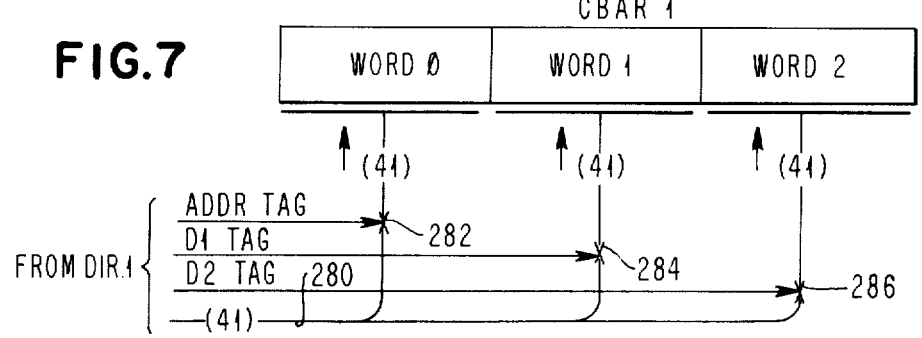

LOAD CBAR SEQUENCES

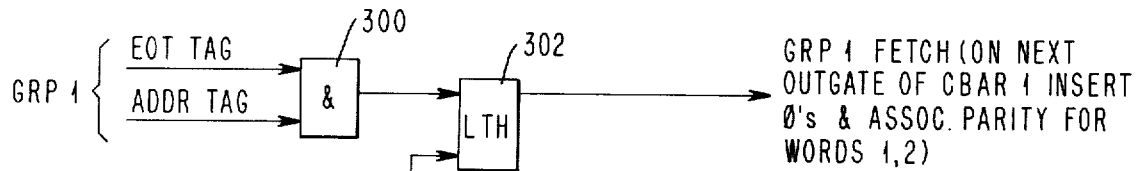
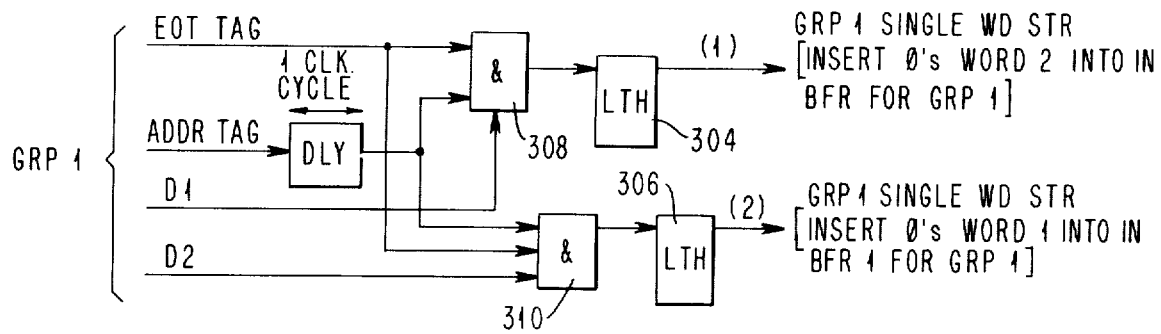
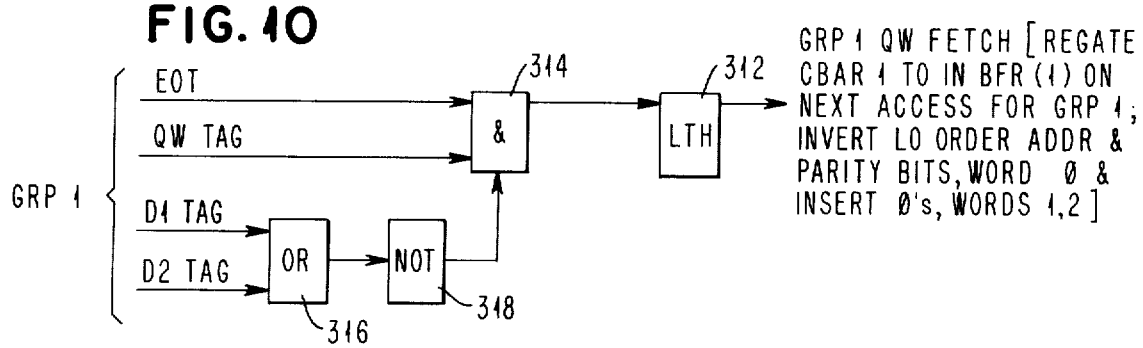
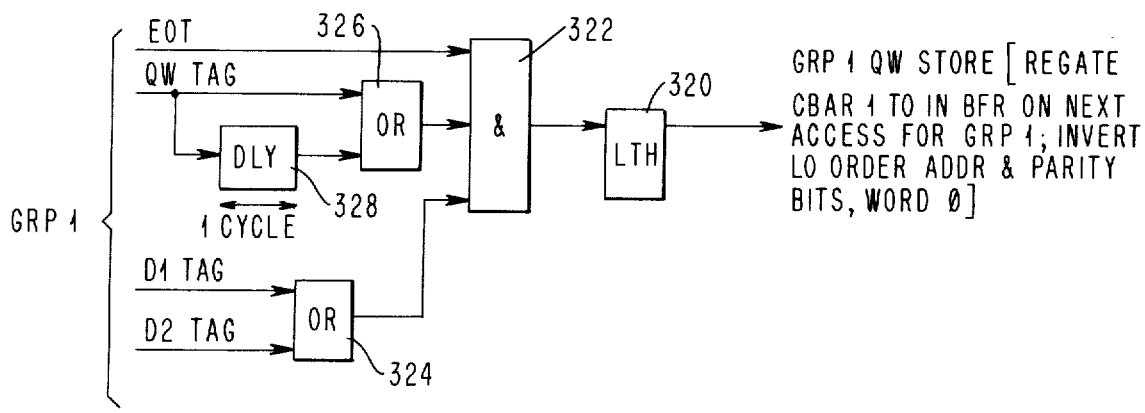

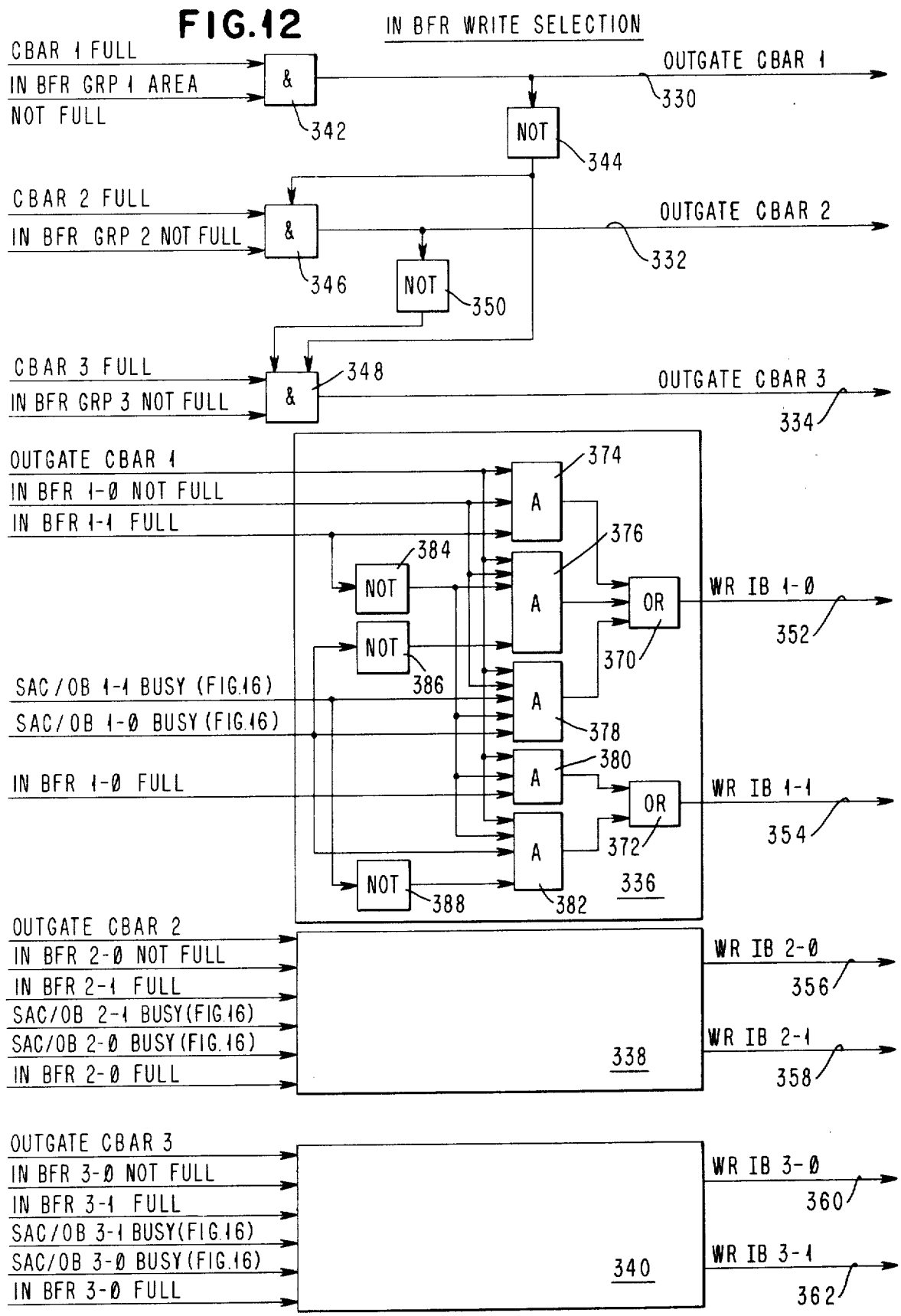

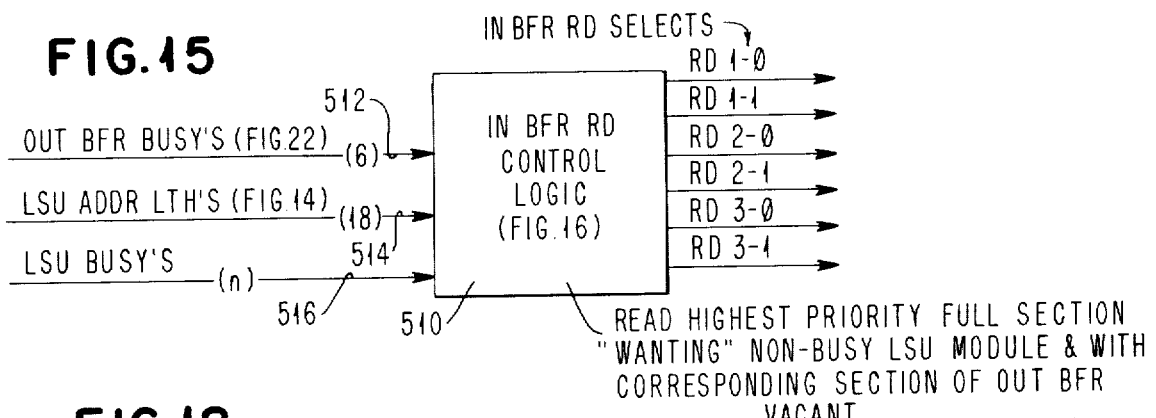
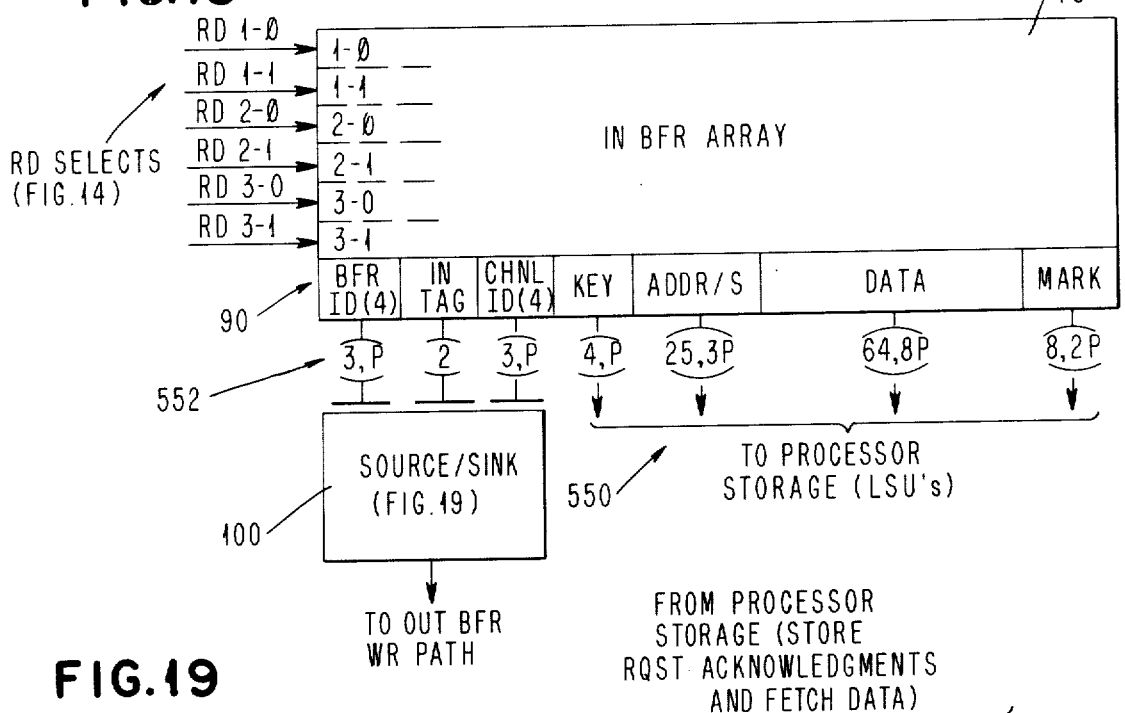
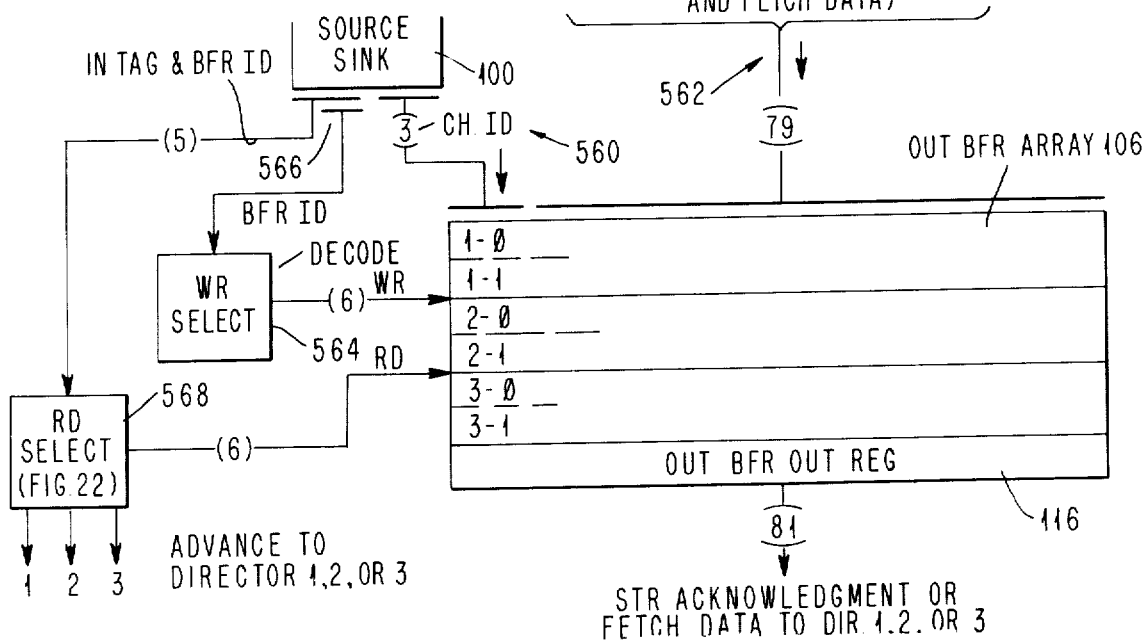

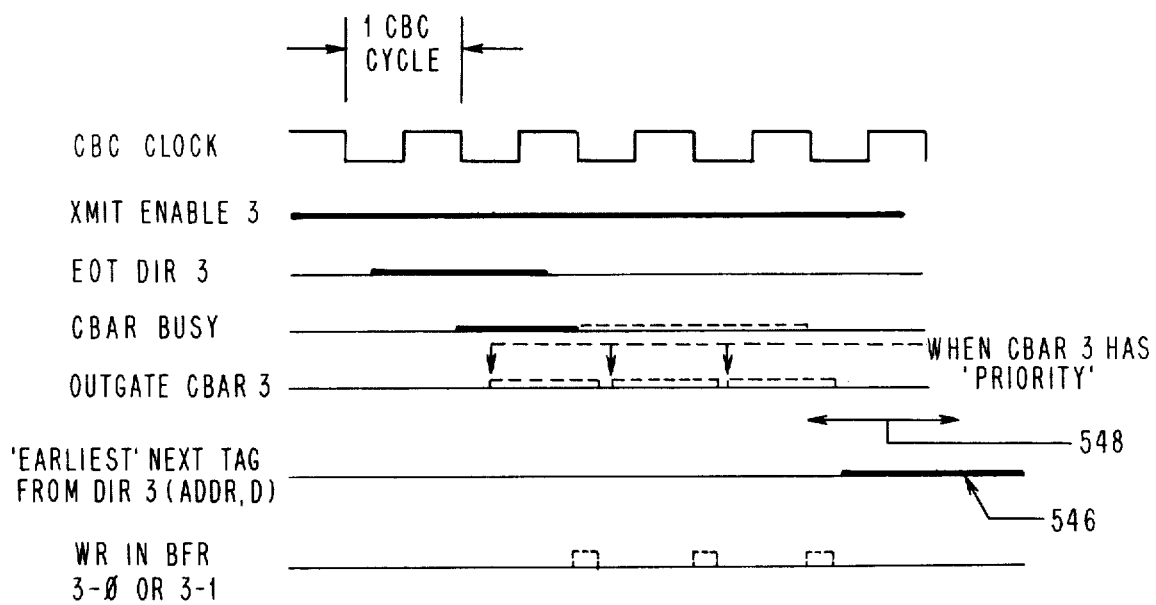

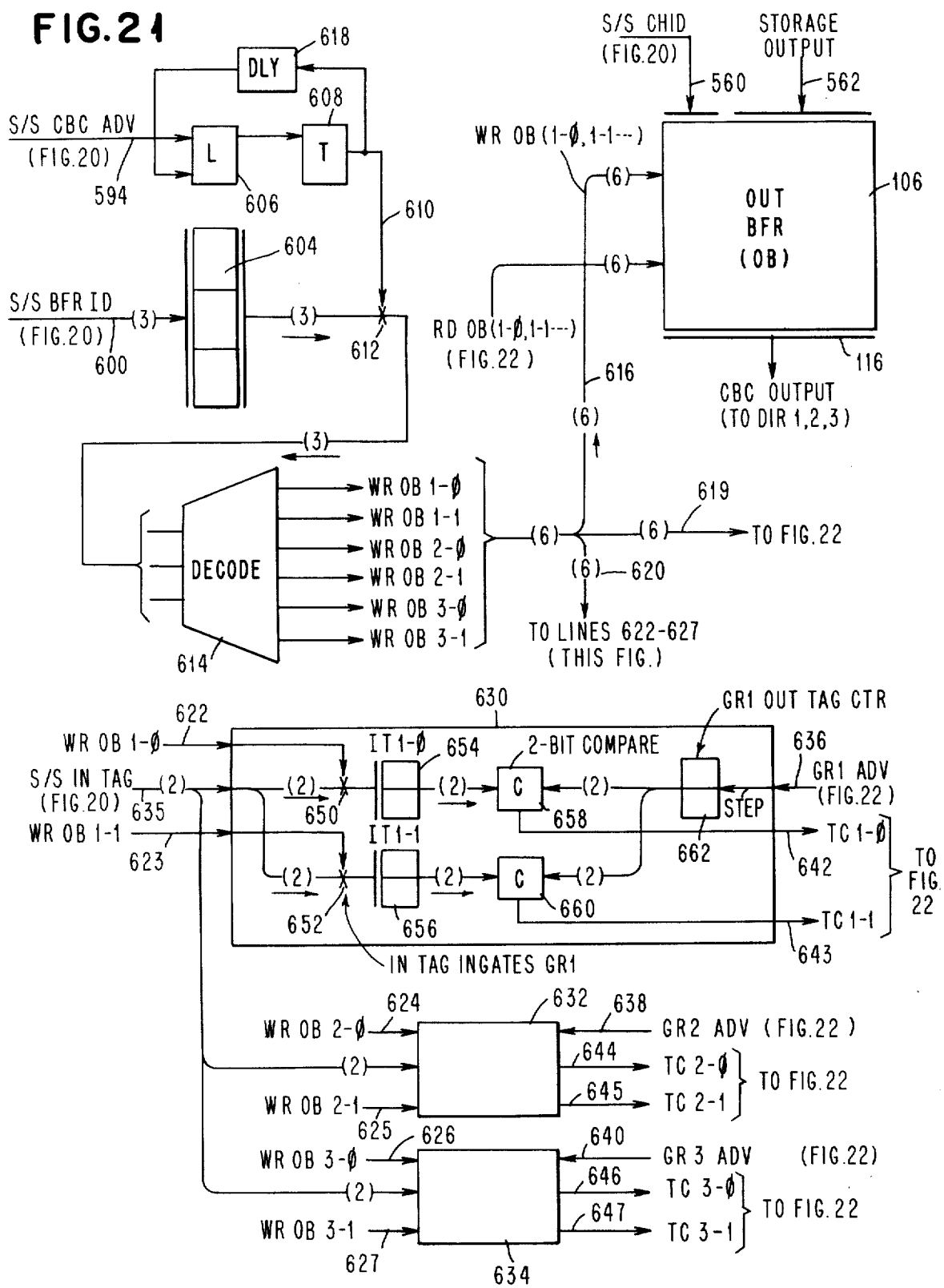

CHANNEL BUS CONTROLLER

BACKGROUND OF THE INVENTION

The subject invention may be viewed essentially as an improvement on storage control systems of the type disclosed in U.S. Pat. No. 3,699,530, granted Oct. 17, 1972 to R. S. Capowski et al and assigned to the assignee of the present application.

A principal object of the present invention is to increase the capacity and rate of information handling in such systems in an economical and efficient manner.

This is accomplished presently by: (1) adapting such systems to be able to operate relative to groups of channels as if they are effectively single channels: (2) arranging input busing to accommodate channel request input flow word-serially relative to a three-word-wide storage interface; (3) handling storage input of four data words from one channel in response to a single request (to speed up input flow); (4) providing quasi-asynchronous transfer of request unit inputs from any channel group when space exists in any associated request buffer; and (5) providing logical intra-group tagging suitable for resolving out-of-sequence interleaved accesses to storage from a group without delaying transitions of associated input buffers from busy to vacant status (i.e., without potentially slowing down input flow).

In connection with the above-mentioned logical tagging a two-bit counter ("In Tag Generator") associated with each channel group is advanced progressively (Modulo 4) in the order of reception of requests by the CBC from the respective group. The state of each tag counter is stored as tag information (Group In Tag), in association with the channel request, in the input buffer (In Buffer array). Buffer ID tag information designating the selected space in the In Buffer array is also stored in association with the request. As information is passed from the In Buffer array to Processor storage the associated Group In Tag and Buffer ID tag are passed to a FIFO queue (source/sink chain) which circulates its contents in time coordination with the outflow of associated information from processor storage (store acknowledgments and fetch data). The output from processor storage is placed in a partitioned Out Buffer array. The space selected is that designated by the Buffer ID information held in the source/sink (i.e., the space corresponding to the In Buffer space occupied by the associated request). As information is removed from the Out Buffer a two-bit counter (Out Tag Generator) associated with the respective group is advanced progressively (Modulo 4). The state of the Out Tag count for each group is compared to In Tags presented at the source/sink output in positional association with Buffer ID tags issued by the source/sink. An occupied space in the Out Buffer array is eligible for transfer out to the respective channel group only if its associated In Tag matches the current Out Tag of its group. Consequently even if storage accesses of a group are taken out of the sequence of input of respective requests to the CBC the outputs for that group will invariably be taken in that input sequence.

The foregoing practice in respect to Buffer ID tag and Group In tag usage permits In Buffer array sections to be marked as vacant as soon as access to storage is available for the respective section, without regard to the intra-group sequence of access to storage. In earlier systems a logical dependency between input buffer occupancy and resolution of output buffer flow presents a potential delay to (obstruction of) input flow.

Another feature of the invention is that channel identity information passed to the subject Channel Bus Controller with each group request circulates through the In Buffer array, the source/sink chain and the Out Buffer array; returning to the respective channel group with the output associated with the original request. Consequently requests of any group can be treated by the subject Bus Controller in a mode transparent to specific channel origins (i.e., as if from a single channel), thereby simplifying handling in the CBC.

The foregoing and other features, objects, advantages and aspects of the subject invention may be more fully appreciated by considering the following detailed description in association with the accompanying drawings.

BRIEF DESCRIPTION OF THE DRAWINGS

FIG. 5 shows specific control and bussing line connections between the CBC and the input/output channel groups;

FIG. 7 shows connections for gating information words from a channel group into individual word segments of a respective CBAR;

FIGS. 8–11 show CBC logic for distinguishing the operation designated by an assembled request unit and for developing control signals relative to the handling of the respective unit over to the In Buffer array;

FIG. 12 shows the logic for selecting the next CBAR to outgate and the In Buffer section into which outgated CBAR information is to be written;

FIGS. 15 and 16 illustrate the logic for selecting the next section of the In Buffer to read out (to storage);

FIG. 17 shows In Buffer input timing;

FIGS. 18 and 19 show data flow paths for transferring information from the In Buffer array to storage and from storage to the Out Buffer array; illustrating the use of the source/sink chain to provide coordinated tag flow relative to inputs to the Out Buffer array;

FIGS. 21 and 22 show the logic for determining the next section of the Out Buffer to be read out (to a channel group).

DETAILED DESCRIPTION

Environmental System

The subject Channel Bus Controller equipment (hereinafter abbreviated CBC) operates in a system environment generally characterized in FIGS. 1 and 2. Multiple processor storage modules 1, 2, . . . 3, are accessed/addressed in interleaved mode under the control of Storage Control Element (SCE) 5. Implied selection of storage modules by element 5 is indicated at 6.

Each cycle of access to one of the modules 1-3, is utilized to accomplish either a fetch (output) or store (input) operation. In a fetch operation information at a module address presented by element 5 is retrieved from storage 1-3 and returned to element 5 for output distribution. In a store operation data presented by element 5 is stored at a designated address location in one of the modules 1-3 and a signal acknowledging completion of such storage is returned via element 5 for distribution to the source of the respective input request. The subject CBC equipment indicated at 7 operates as a buffer between element 5 and groups of input/output channels indicated generally at 9. Bus Control Element (BCE) 11 operates to provide an interface between central processors indicated generally at 12 and a high speed cache buffer 14. Element 11 also provides an interface between maintenance and display console equipment indicated at 15 and cache 14. Element 11 also communicates with element 5 to compete with CBC 7 for access to storage modules 1-3. Elements 11 and 14 form no part of the present invention and are shown only to illustrate the competitive nature of the environment. Element 5 forms no part of the subject invention other than as a source/sink of information processed by the CBC.

Figure 2:
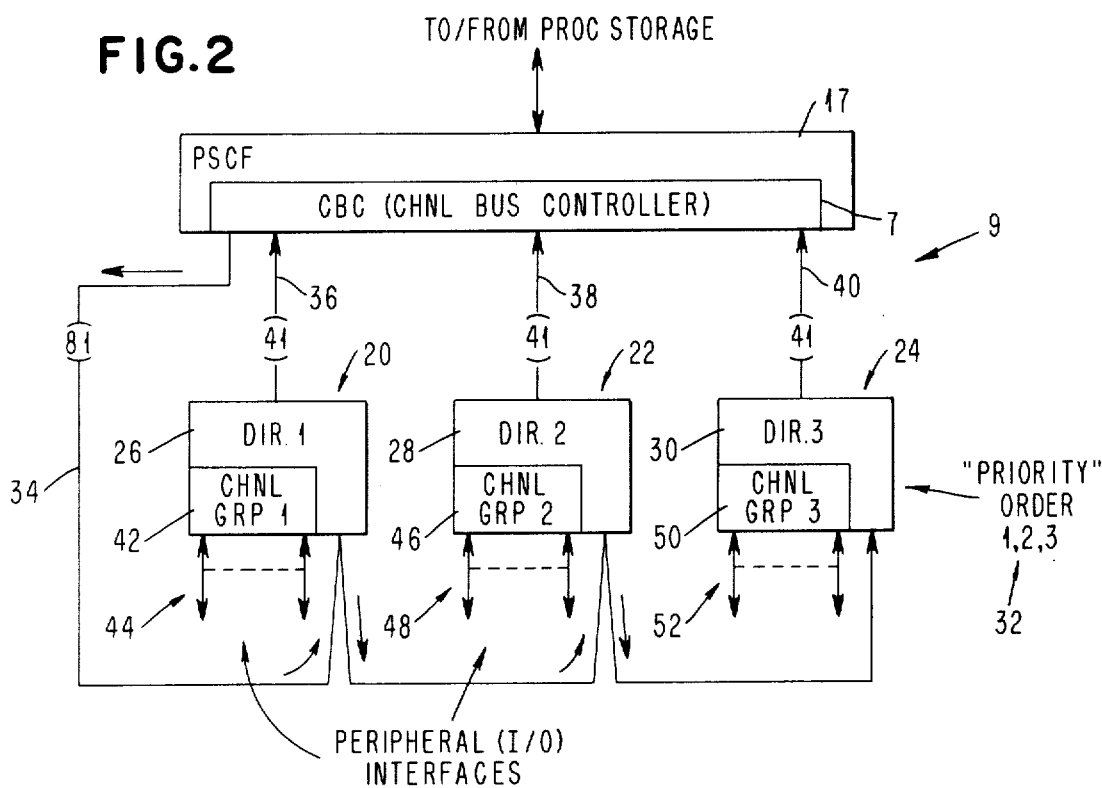
FIG. 2 shows typical input and output bussing connections between the CBC and groups of input/output channels in the environment of FIG. 1.

Communication interface 9 to the channel groups is indicated generally in FIG. 2. In the illustrated embodiment CBC 7 connects with up to three groups of channels indicated at 20, 22 and 24. In a typical preferred embodiment there are six channels in each group 20 and 22 and four channels in group 24.

The channels in a group are controlled in common by shared group circuits termed the Director. The group 20, hereinafter called Channel Group 1 (abbreviated CHNL GRP 1), is controlled by Director 26 hereinafter termed Director 1 (abbreviated DIR 1). Group 22, hereinafter termed Channel Group 2 is served by Director 28 hereinafter termed Director 2. Group 24 hereinafter designated Channel Group 3 is served by Director 30 hereinafter termed Director 3. As indicated at 32 within the CBC the priority order of traffic relative to these groups is: 1, 2, 3 (i.e., where contention exists traffic of group 1 has highest priority, then group 2 and last group 3). The directors and channels form no part of the present invention other than as sources and sinks of information processed by the CBC and are shown only to complete the environmental description.

Information flows from the CBC to the directors, in synchronous mode, via a common 81-bit wide data bus path indicated at 34. Information flows from directors 1, 2 and 3 to the CBC via individual (separate) 41-bit wide bus paths respectively 36, 38 and 40. The channels of group 1 indicated at 42 communicate individually with I/O controllers and I/O devices at respective peripheral I/O interfaces 44. Likewise the channels of group 2 shown at 46 have individual external interfaces shown at 48, and the channels of group 3 at 50 have interfaces 52.

CBC Organization – Introduction

Figure 3:
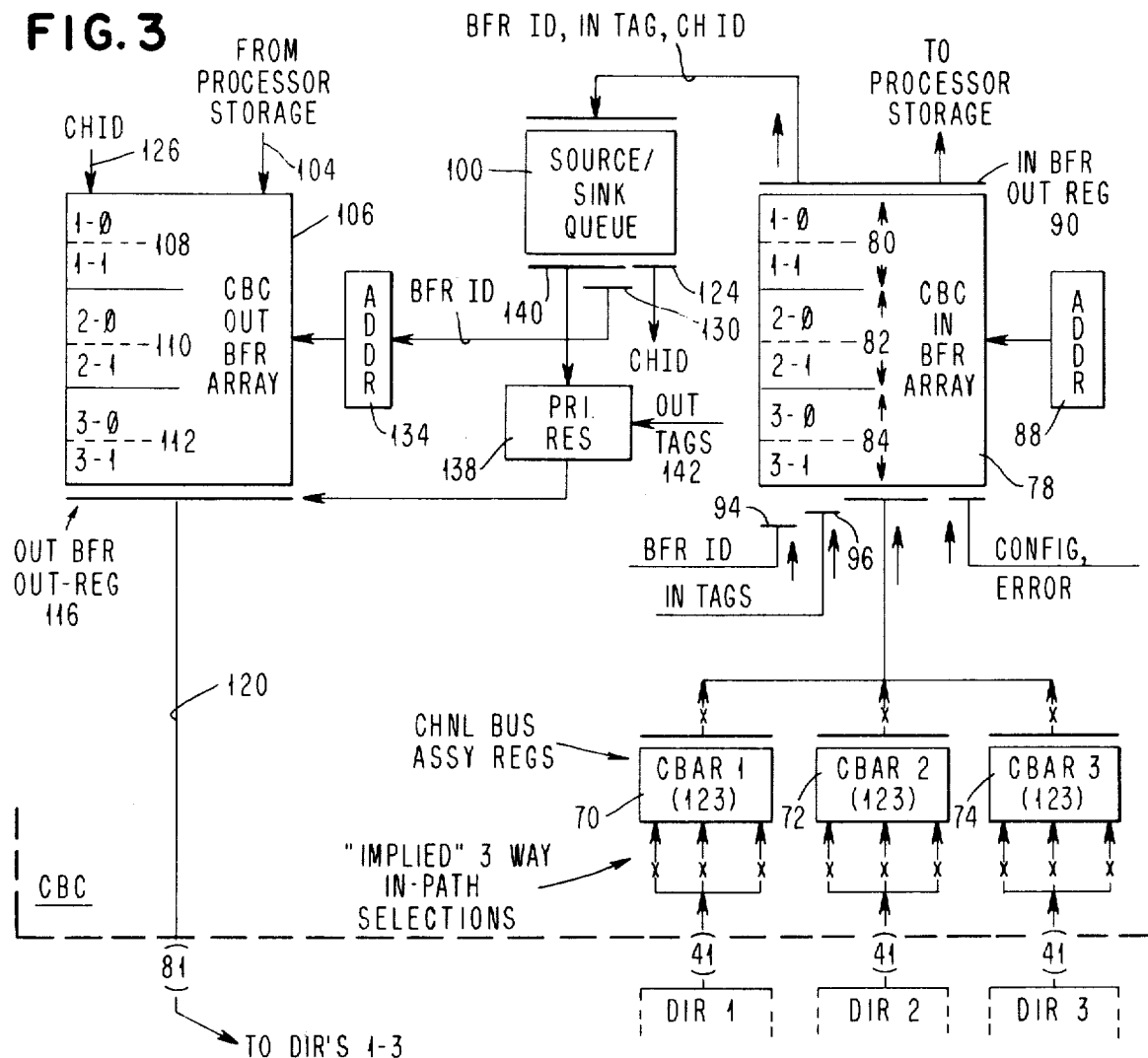
FIG. 3 shows the internal "data flow" organization of the CBC.

The internal organization of the CBC is suggested schematically in FIG. 3. Information sent one word at a time from channel groups 1-3 is assembled into request units, of one, two or three words, in respective Channel Bus Assembly Registers (CBAR's) 70, 72, 74. The CBAR 70 receiving traffic from Channel Group 1 is also called CBAR 1. The CBAR 72 associated with Channel Group 2 is also called CBAR 2. The CBAR 74 associated with Channel Group 3 is also called CBAR 3. Each CBAR register (refer also to FIG. 4) is 123 bits wide. Each assembles one, two or three 41-bit "words" from the respective channel group/director into a request unit (entity) consisting of a request word and zero, one or two data words. Each is loaded under quasi-asynchronous "ENABLE" control described later.

CBAR's which are full compete (in priority order 1, 2, 3) for access to vacant sections of the "shared" In Buffer array 78. Array 78 is partitioned into areas 80, 82 and 84 which are dedicated to (reserved for) traffic of respective Channel Groups 1, 2 and 3. That is, outputs of CBAR's 1, 2 and 3 go only to respective areas 80, 82 and 84. Each area 80, 82, 84 comprises two sections. The sections of area 80 dedicated to Group 1 traffic are denoted 1-0 (in the drawings number "0" is written "φ" to distinguish from upper case letter O) and 1-1. The sections of area 82 dedicated to Group 2 traffic are denoted 2-0 and 2-1. The sections of area 84 dedicated to Group 3 traffic are denoted 3-0 and 3-1. Each section can receive the assembled content of a respective CBAR in one bit-parallel transfer.

The logic for selecting individual sections of buffer 78 (for write-in and read-out) is indicated generally at 88. Competition for write-in access is resolved according to group priority (1, 2, 3). Occupied sections of buffer 78 [occupancy indicated by BUSY (FULL)/NOT BUSY (NOT FULL) latches per section discussed later] compete for access to storage via the shared output register 90. Competition for storage access is resolved on the basis of accessibility of the addressed storage module designated by the section contents, group priority (1, 2, 3), section priority within each group area (the "0" section has precedence over the "1" section if other conditions are satisfied for both) and availability of respective sections in the Out Buffer array discussed later. The accessibility of storage modules to In Buffer traffic is affected by competition from traffic of other sources (e.g., the central processors) as indicated in FIG. 1.

Each CBAR register contains three 41-bit segments (FIG. 4); denoted word 0, word 1 and word 2. These segments are overwritten but not intermediately "reset". Associated with each CBAR is a respective trigger 92 (FIG. 4) designating the occupancy state [BUSY (FULL)/NOT BUSY (EMPTY)] of the respective CBAR which is used to control transfers of information to and from the respective CBAR in a manner described later. A unit entry to any CBAR consists of a request word transferred from the respective channel group into the word 0 segment and may include 0, 1 or 2 data words. The data words are transferred from the respective channel group and steered selectively by D1 and D2 tags discussed later into word 1 and word 2 segments.

The request word comprises address, key, operation (S), channel identity (CHID) and, parity (P) information, and a fixed address bit which when active indicates a particular address translation requirement not relevant to the present invention. There are several unused/spare bit positions in the word 0 segment. The address and key respectively designate a storage address for an operation and the protection key for that address. The operation bit S distinguishes the operation to be performed by storage as either a fetch (0) or store (1). The channel identity tag (CHID) designates a specific channel which represents the specific source of the request in the associated group and the specific destination/sink to which information recovered in response to the request is ultimately to be delivered. The parity bits (P) are used by the CBC to check the request information. The checks are not shown and are not relevant to the present invention.

A fetch request unit consists only of the request word in word 0 segment. Contents of word 1 segment and word 2 segment are "ignored" by the CBC and replaced by zero "filler" words inserted into the In Buffer. A store request unit comprises of the request word in word 0 segment and either one or two data words in word 1 and word 2 segments. The data words include data bytes and mark bits designating which data bytes are to be stored contiguously. In a singleword store operation a single data word is transferred from the respective channel group into either word 1 segment or word 2 segment of the CBAR and a zero filler word is "stuffed" into the outgating path of the other segment by "automatic" action of CBC control logic.

In association with each request transfer to the In Buffer the CBC generates Buffer ID and Group In tags. These are stored, via input paths 94 and 96 (FIG. 3), in association with the respective request unit in the respective section of the In Buffer. The Buffer ID tag designates the respective In Buffer section receiving the unit and the Group In tag designates the sequence of entry of the respective unit into the CBC relative to other units of the same group.

As request units are transferred to processor storage, from output register 90 of In Buffer 78, the associated tags (channel ID, Buffer ID and Group In) are transferred to source/sink chain 100. Chain 100 operates in a FIFO (first in first out) mode, in time coordination with the accessing of storage. Tag entries in the queue thereby are accessible in association with respective outputs of storage.

Outputs from processor storage (fetched data and acknowledgments of store/input operations) are transferred via bus 104 into Out Buffer array 106. Array 106 is partitioned into group-dedicated areas 108, 110 and 112 corresponding respectively to areas 80, 82 and 84 of the In Buffer array 78. These areas in the Out Buffer are further sub-divided into sections corresponding to the In Buffer sections; denoted by 1-0, 1-1, 2-0, 2-1, 3-0 and 3-1. The contents of occupied sections of Out Buffer array 106 (occupancy being indicated by vacancy/busy latches shown in FIG. 22 and discussed in respect to that figure) compete for access via shared output register 116 to output bus 120 which links to the directors (channel groups).

The channel ID tag exits from source/sink 100 at 124 into Out Buffer in-gating path 126, and is thereby stored with, and sent out to the respective director with, respective storage outputs. This enables the director to distribute output traffic to individual channels without burdening CBC logic.

The Buffer ID tag exits queue 100 at 130 where it connects to logic 134 for selecting the Out Buffer section to be written into from storage (i.e., the section corresponding positionally to the In Buffer section previously occupied by the respective request).

The Buffer ID and Group In tags pass from queue 100 to read-out priority resolution logic 138 via outlet 140 of queue 100. Logic 138 uses these tags together with Group Out tag information presented at 142 to order the sequence of outputs from Out Buffer 106 to each director in the sequence of entry of requests of the associated group (into the CBC); even though said requests may be applied to storage in a different sequence. This is described in more detail later (in discussion of FIG. 21).

NOT shown advance lines considered in the discussion of FIG. 5 below condition individual directors to distinguish and accept associated group traffic on the bus 120.

Director - CBC Communication

Referring to FIG. 5, Director 1 and the CBC develop internal clock timing from a common system timing reference received at 150. Directors 2 and 3 use the same reference received respectively at 151 and 152 to develop their internal clock timings. The same reference is also used by the storage controls 5.

The first leg 154 of the 81-bit output bus from the CBC connects to Director 1. The continuation of this bus from Director 1 to Director 2 is indicated at 156. The continuation from Director 2 to Director 3 is indicated at 158. Separate advance lines 160, 162 and 164 (also termed Advance 1, Advance 2 and Advance 3) extend from the CBC to respective Directors 1, 2 and 3. One of these advance lines is elevated just prior to presentation of output information on bus section 154, thereby selecting the respective director to receive the information on the output bus.

For transfers of information in the reverse direction, from the directors to the CBC, there are separate Transmit Enable lines 170, 172 and 174 (also termed Transmit Enable 1, 2 and 3). These extend from the CBC to respective directors 1, 2 and 3 and are respectively elevated when either the respective CBAR is not busy (vacant) or either section in the respective In Buffer area (80, 82 or 84) is not busy. When elevated these lines allow respective directors to forward information to the CBC one word at a time on respective 41-bit wide input buses 180, 182 and 184.

A director may transmit repeatedly so long as the respective transmit enable line is elevated; i.e., it need not wait for the respective transmit enable line to fall and rise between consecutive transmissions. Hence this mode of operation is termed quasi-asynchronous.

With each transmission the respective director elevates a respective Address (ADDR) Tag line or Data 1 (D1) tag line or Data 2 (D2) tag line. The Address Tag lines for Directors 1, 2 and 3 are respectively indicated at 190, 192 and 194. The D1 tag lines for Directors 1, 2 and 3 are respectively indicated at 200, 202 and 204. The D2 tag lines for Directors 1, 2 and 3 are respectively indicated at 210, 212 and 214.

Directors 1, 2 and 3 employ respective quad-word (QW) tag lines 220, 222 and 224 to signal the CBC that the associated request is for a four-word data transfer operation (either fetch or store). Directors 1, 2 and 3 use respective EOT (End of Transmission) tag lines 230, 232 and 234 to signal the conclusion of a unit of transfer relative to the CBC, as explained further below.

Request Format

Figure 6:
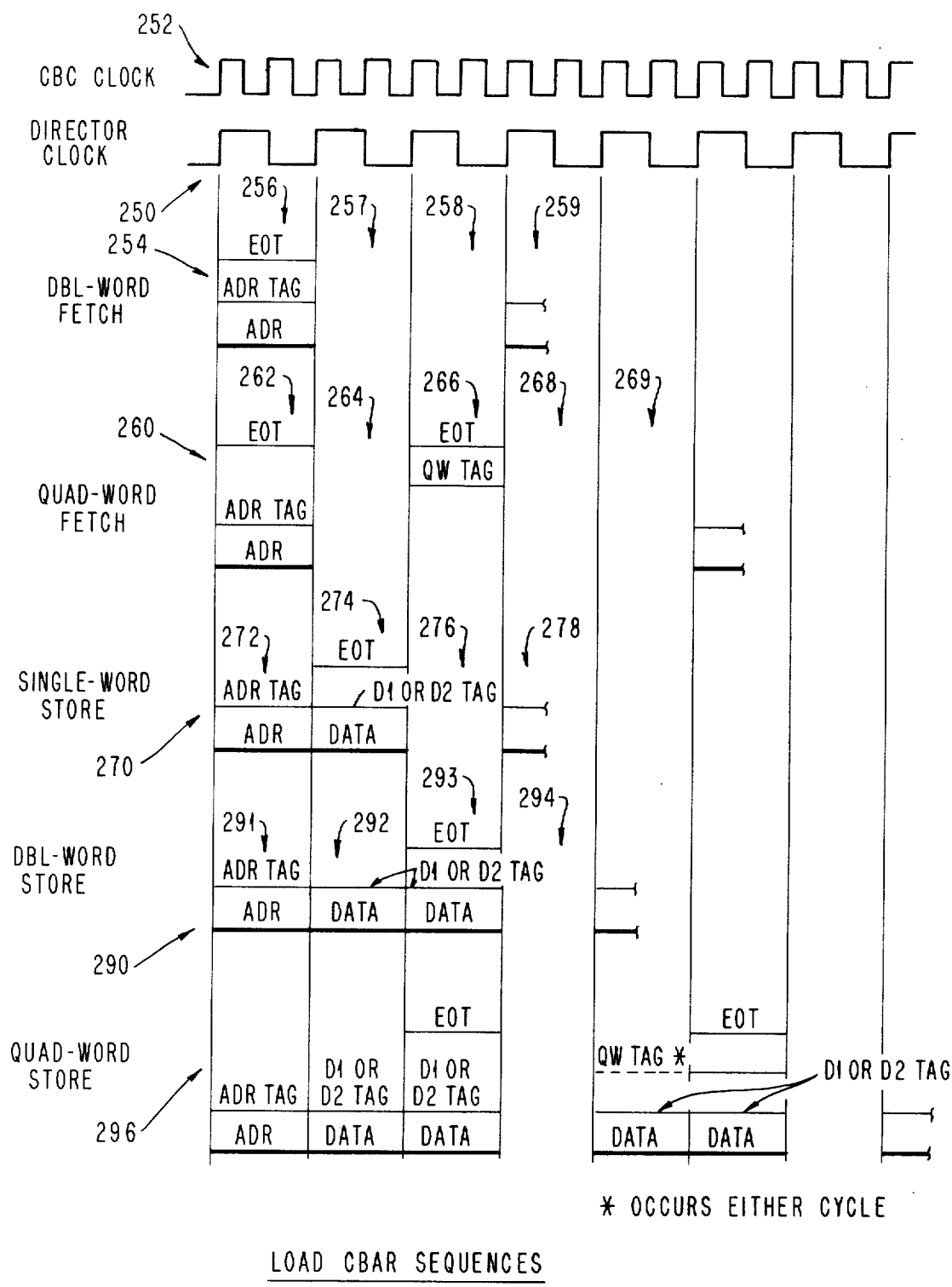
FIG. 6 shows tag signalling protocols used by each channel group for transferring information to the CBC.

Referring to FIG. 6 a unit of information transfer from any director to the CBC comprises either a fetch request or a store request. A fetch request may call for transfer from storage of either two words of data (doubleword fetch) or four words of data (quad-word fetch). A store request may call for either one, two or four words of data to be transferred to storage. In a store operation the data accompanies the request.

The relative timing of director and CBC clocks is indicated at 250 and 252 in FIG. 6. A doubleword fetch indicated at 254 in FIG. 6 occupies three Director clock cycles (six CBC cycles); one Director cycle 256 to transfer a request word and two idle cycles 257 and 258, following which another unit transfer can be initiated as suggested at 259. In a doubleword fetch the director sends the request word (abbreviated ADR for "address") simultaneously with an address tag and EOT tag.

A four-word (quad-word) fetch indicated at 260 in FIG. 6 occupies five Director clock cycles (ten CBC cycles); an active cycle of transmission 262 followed by an idle cycle 264, followed by an active cycle 266, followed by two idle cycles 268 and 269. In the first active cycle 262 the director sends a request together with address tag and EOT tag. In the second active cycle 266 the EOT and quad-word tags are sent without any other information. The CBC responds to this tag combination in a manner described later to insert zero filler words and associated parity into the data/mark word positions of the request unit.

In a store (READ) operation the request unit consists of the request word and one or more data words. A single word store operation indicated at 270 in FIG. 6 occupies three Director cycles (i.e., the same amount of time as a doubleword fetch). The first two cycles 272 and 274 are active and the third cycle 276 is idle. After the idle cycle further transmission can begin as suggested at 278. In the first active cycle 272 the request word is sent with an address tag and in the second active cycle a data word is sent with either a D1 or D2 tag.

FIG. 7, which illustrates CBAR 1 ingating, shows that when the address tag is sent from Director 1 information on the respective Group 1 input bus 280 is passed via gates suggested at 282 into the word 0 segment of the respective CBAR. When D1 tag is sent gates suggested at 284 connect the Group 1 input bus to word 1 segment of CBAR 1. When D2 tag is sent gates suggested at 286 connect the input bus to word 2 segment of CBAR 1. It will be understood that similar gating is provided between Director 2 and CBAR 2 and also between Director 3 and CBAR 3.

Referring to FIGS. 6 and 7, in each unit request transfer the address tag steers the address information into the word 0 segment of the respective CBAR. In a singleword store 270 the D1 or D2 tag line, whichever one is raised, steers the data and mark information on the respective input bus into the respective CBAR word segment 1 or 2 (segment 1 if D1 or 2 if D2).

A doubleword store (READ) 290 occupies four Director clock cycles; three active cycles 291, 292 and 293 and an idle cycle 294. In the first active cycle 291 the request word is steered by the address into word 0 segment of the respective group CBAR. In the second and third active cycles 292 and 293 data is sent accompanied by D1 and D2 tags in arbitrary sequence. In the third cycle the EOT tag is sent. For a normal READ request the D1 tag is sent in the second active cycle and the D2 tag in the third active cycle. For a READ BACKWARD request the D2 tag is sent first and the D1 tag second, thereby reversing the effective positional order of the input data in storage.

A quad-word store 296 occupies seven Director clock cycles (three active followed by one idle, followed by two active, followed by one idle). The address is sent with the address tag followed by two data/mark words with D1 and D2 tags; D1 first for an ordinary (forward) READ or D2 first for a READ BACKWARDS. The EOT tag is sent in the third active cycle. In the fifth and sixth cycles two additional data words are sent with D1 and D2 tags (D1 first for a READ, D2 first for a READ BACKWARDS). The quad-word tag is sent either in the fifth or sixth cycle. The EOT tag is sent again in the sixth cycle. The seventh cycle is idle as explained previously.

As explained earlier the Transmit Enable line to each director 170, 172 or 174 (FIG. 5) is required to be up whenever a vacancy exists either in the respective CBAR or in either section of the respective In Buffer group area 80, 82 or 84 (FIG. 3). Enable up permits the respective director to transmit "continuously" to the CBC without waiting for Enable to fall and rise (or other "acknowledgment") between successive transfers. The respective CBAR is filled in three CBC cycles. In view of the above "continuous enablement" requirement if a vacancy exists in the respective In Buffer area the filled CBAR must be immediately outgated to the In Buffer (to keep that CBAR accessible to its Director). This requirement is met taking into account the operation of three CBAR's by making the In Buffer susceptible of being written into once in each CBC cycle (i.e., once per CBAR per three cycles).

CBC Controls For Request Transfers

The CBC control logic for reacting to conditions represented by the tag lines from the individual directors is indicated in FIGS. 8 through 11. These figures show Group 1 controls relative to Director 1 and the respective CBAR 1. It should be understood that identical corresponding control logic is provided relative to each of the other Directors 2 and 3.

Referring to FIG. 8 AND circuit 300 responds to coincidence of EOT tag and address tag from Director 1 to set latch 302. Latch 302 set indicates a Group 1 Fetch condition associated with assembly of a fetch (output) request in CBAR 1. On the next outgating of CBAR 1 into In Buffer area 80 this condition blocks outgating of word 1 and word 2 segments of CBAR 1 and permits the CBC to insert zero filler words and associated parity into respective outgate paths.

FIG. 9 shows latches 304 and 306 for detecting assembly of a singleword store request in CBAR 1 relative to channel Group 1. The single data word sent with the request is steered to word 1 or word 2 segment by a respective D1 or D2 tag. Latch 304 is set when the D1 tag is used and latch 306 is set when the D2 tag is used. AND 308 sets latch 304 when Group 1 D1 tag accompanies Group 1 EOT one cycle after Group 1 address tag is received. AND 310 sets latch 306 when Group 1 D2 tag accompanies Group 1 EOT one cycle after Group 1 address tag.

Latch 304 blocks outgating of word 2 segment of CBAR 1 and causes a zero filler word with correct parity to be inserted into the normal outgoing path from word 2 segment of CBAR 1 to the In Buffer. Conversely when latch 306 is set output from CBAR 1 word 1 segment is blocked and a zero filler word is inserted.

FIG. 10 shows that assembly of a Group 1 quad-word fetch request is accompanied by setting of latch 312 by operation of AND circuit 314. AND circuit 314 responds to coincidence of Group 1 EOT and quad-word tags when D1 and D2 tags of that grou are both inactive. Inactivity of the D1 and D2 tags is manifested by OR circuit 316 in combination with NOT (inverter) circuit 318. Latch 312 set causes inversion of a low-order address bit (designating a doubleword boundary in storage) and an associated parity bit, when the second request unit of a quad-word fetch request is outgated from CBAR 1 to In Buffer 78. In such outgate transfers paths from word 1 and word 2 segments of CBAR 1 are disabled and zero filler words with appropriate parity are inserted into respective continuation paths into the In Buffer 78.

FIG. 11 indicates latch 320 set when a Group 1 quad-word store (READ or READ BACKWARD) is assembled in CBAR 1. Latch 320 is set by AND circuit 322, which responds to coincidence of EOT tag and either data tag, D1 or D2, (manifested by OR circuit 324) and QW tag (either immediate or delayed as manifested by OR circuit 326; the delay 328 being one CBC cycle). Latch 320 set causes the CBC to invert the low order address bit and the associated parity bit when the request word in the associated unit (which is then a second unit of a quad-word set) is transferred from the word 0 segment of CBAR 1 to the In Buffer (as in the quad-word fetch action associated with FIG. 10). This passes an address designating a consecutive doubleword boundary in storage to the In Buffer accompanied by the third and fourth data words (and mark bits) of the quad-word set.

In Buffer Write Selection

FIG. 12 illustrates the logic for determining which section of In Buffer 78 is to be loaded (written into) in any cycle of input/write access to the In Buffer. The upper portion of this figure indicates generation of CBAR outgate control signals at 330, 332 and 334, for CBAR 1, CBAR 2 and CBAR 3 respectively. These CBAR outgates are applied to respective logic circuits 336, 338 and 340 associated with write-selection of respective In Buffer areas 80, 82 and 84 (FIG. 3).

Outgate lines 330, 332 and 334 operate to gate out the highest priority CBAR having a vacancy in the respective In Buffer area. It will be recalled that the group priority order is one, two, three; that is traffic of Group 1 (CBAR 1) takes precedence over traffic of Group 2 (CBAR 2) which takes precedence over traffic of Group 3 (CBAR 3). Consequently "Outgate CBAR 1" at 330 is raised when AND circuit 342 detects occupancy of CBAR 1 and a vacancy in the corresponding area 80 of In Buffer 78. NOT circuit 344 prepares AND circuit 346 when "Outgate CBAR 1" is not active. AND circuit 346 then responds to CBAR 2 full and vacancy in area 82 of the In Buffer to raise "Outgate CBAR 2". AND circuit 348 is prepared by inactivity of "Outgate CBAR 1", indicated by NOT circuit 344, and inactivity of "Outgate CBAR 2", indicated by NOT circuit 350. When prepared AND 348 responds to occupancy of CBAR 3 coincident with vacancy in the associated In Buffer area 84 and raises "Outgate CBAR 3".

Logic 336 responds to "Outgate CBAR 1" and other inputs discussed later to raise line 352 or 354. This selects a respective section 1-0 or 1-1 in area 80 of In Buffer 78 for write-in. Logic 338 responds to Outgate CBAR 2 and indicated other inputs to raise line 356 or 358 and thereby select either section 2-0 or 2-1 in area 82 of In Buffer 78 for write-in. Logic circuit 340 responds to "Outgate CBAR 3" and indicated other inputs to raise line 360 or 362 and thereby select either section 3-0 and 3-1 in In Buffer area 84 for write-in. Logic circuits 336, 338 and 340 are identical internally. Consequently only the details of logic circuit 336 need be discussed.

Logic 336 operates to implement the rule that if only one section in the associated In Buffer area 80 is vacant that section is to be filled, and if both sections of area 80 are vacant then section 1-0 is to be filled unless conditions derived from FIG. 16 (discussed later) indicate that section 1-0 of Out Buffer 106 (FIG. 3) is either full or about to be filled and Out Buffer 1-1 is both vacant and not about to be filled.

This "rule" is indicated in the following truth table:

| IB k-0 Busy | IB k-1 Busy | SAC/OB k-0 Busy | SAC/OB k-1 Busy | CBAR k LOADS SECTION |
|---|---|---|---|---|
| No | No | No | No | k-o |
| No | No | — | Yes | k-o |
| No | No | Yes | No | k-1 |
| No | Yes | — | — | k-0 |
| Yes | No | — | — | k-1 | where:
"k" denotes group (i.e., 1, 2 or 3) having current priority for write-in access to In Buffer
"IB" denotes In Buffer
"OB" denotes Out Buffer
"SAC" denotes "storage access in process relative to"
"—" denotes "don't care".

When operated, OR circuit 370 excites its output line 352 causing In Buffer section 1-0 to be selected for write-in (WR IB 1-0). When operated, OR circuit 372 stimulates line 354 causing In Buffer section 1-1 to be selected (WR IB 1-1).

OR 370 is operated when one of the AND circuits 374, 376 or 378 is operated, and OR 372 is operated when one of the AND circuits 380 or 382 is operated. Each of the foregoing AND circuits is prepared by "Outgate CBAR 1" active. When prepared AND circuit 374 responds to "In Buffer 1-0 Not Full" and "In Buffer 1-1 Full" to operate OR 370 and thereby select In Buffer section 1-0 (as the only vacant section) for write-in. When prepared AND 380 responds to "In Buffer 1-0 Full" and "In Buffer 1-1 Not Full", the latter manifested as the inverse of "In Buffer 1-1 Full" by connection to NOT circuit 384, to operate OR 372 and thereby select (the only vacant) section 1-1 for write-in.

AND 376 responds to In Buffer 1-0 Not Full, In Buffer 1-1 Not Full (from NOT 384) and the inverse of SAC/OB 1-0 Busy (manifested by NOT circuit 386) to operate OR 370. SAC/OB 1-0 Busy indicates Out Buffer 1-0 is full or about to be filled (Storage Access in progress for 1-0). Active output from NOT 386 thereby indicates that Out Buffer 1-0 is not full and not about to be filled.

When prepared AND 378 responds to In Buffers 1-0 and 1-1 both not full and SAC/OB 1-0 and 1-1 both Busy to operate OR 370 (i.e., all access conditions equal section 1-0 gets write-in preference).

When prepared AND 382 responds to conditions representing In Buffer 1-1 Not Full, SAC/OB 1-0 Busy and SAC/OB 1-1 Not Busy, the latter manifested by NOT 388, to operate OR 372. Response of AND 382 effectively occurs only if In Buffer sections 1-0 and 1-1 are both vacant, and Out Buffer 1-0 is full or about to be filled (SAC/OB 1-0) and Out Buffer 1-1 is both vacant and not about to be filled.

Group Vacancy/Occupancy

Figure 4:
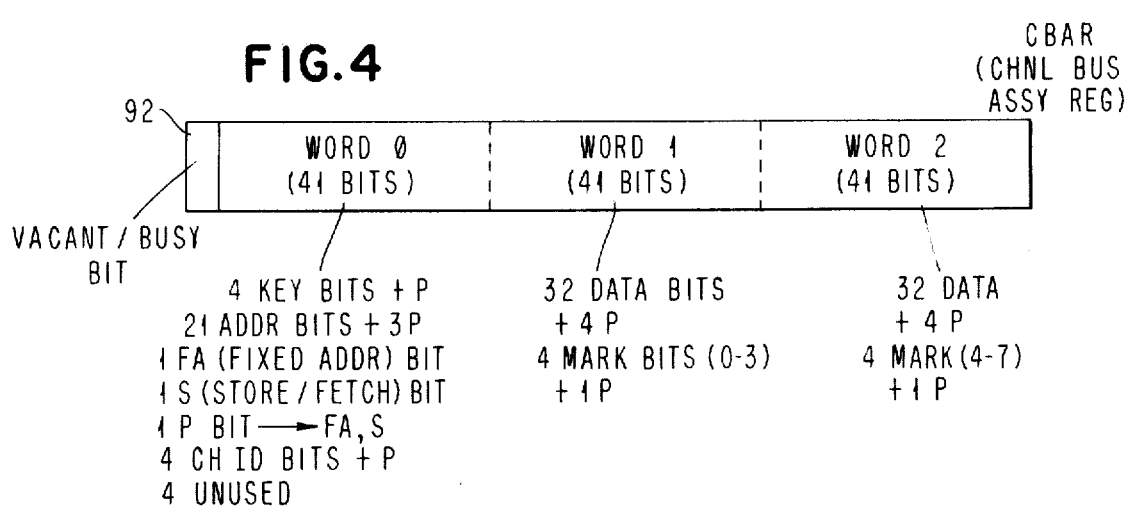
FIG. 4 shows a channel bus assembly register (CBAR) and request unit information susceptible of being assembled therein.
Figure 13:
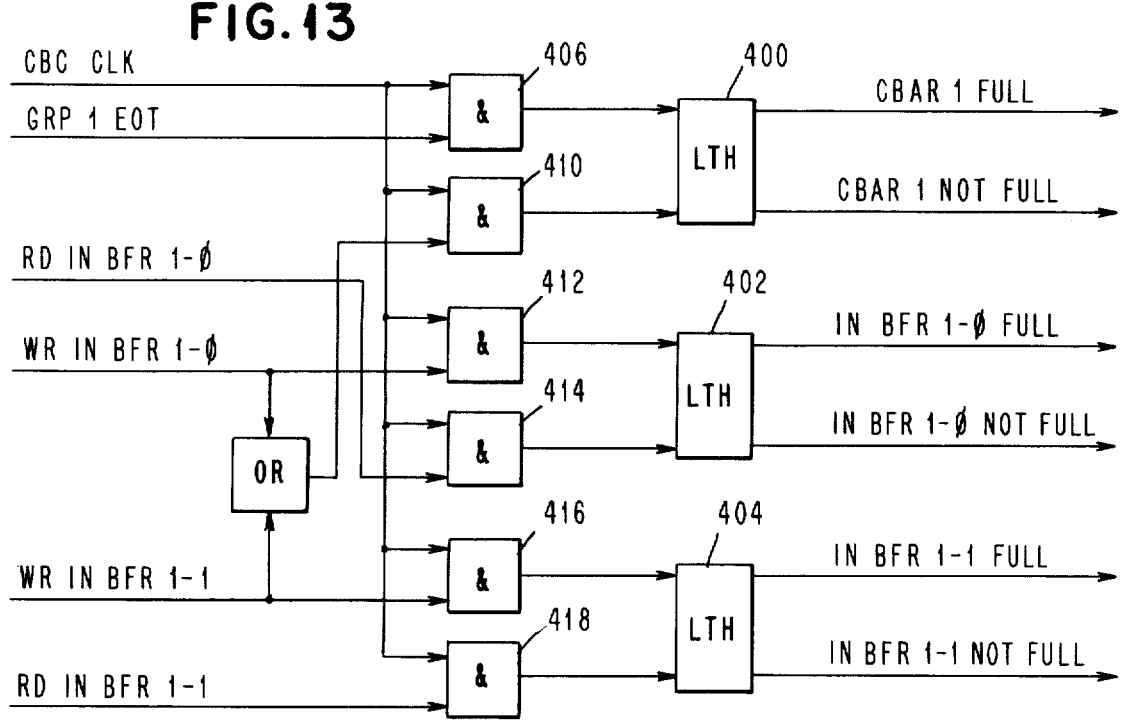
FIG. 13 shows logic for indicating vacancy/occupancy of the CBAR's and the In Buffer sections.

FIG. 13 shows the logic of vacancy/occupancy indication for Group 1 input buffers. Identical logic is provided for each of the other Groups 2 and 3. Latch 400 indicating vacancy/occupancy of CBAR 1 corresponds to latch 92 (FIG. 4). Latch 402 indicates vacancy/occupancy of In Buffer section 1-0. Latch 404 indicates vacancy/occupancy of In Buffer section 1-1.

Latch 400 is set by AND 406 which responds to Group 1 EOT tag (from Director 1). Latch 400 set indicates CBAR 1 full (busy). Latch 400 is reset to indicate CBAR 1 not full (vacant) when information is written into In Buffer section 1-0 or 1-1. Write-in to In Buffer 1-0 or 1-1 is indicated by OR 408 and AND 410.

Latch 402 is set by AND 412 to indicate In Buffer 1-0 full. AND 412 responds to write selection of In Buffer 1-0. AND circuit 414 responds to read selection of In Buffer 1-0 to reset latch 402 which then indicates In Buffer 1-0 not full.

AND 416 sets latch 404 to indicate In Buffer 1-1 full when that section is write selected. AND circuit 418 resets latch 404 to indicate In Buffer section 1-1 not full when that section is read selected.

In Buffer Transfers

Figure 14:
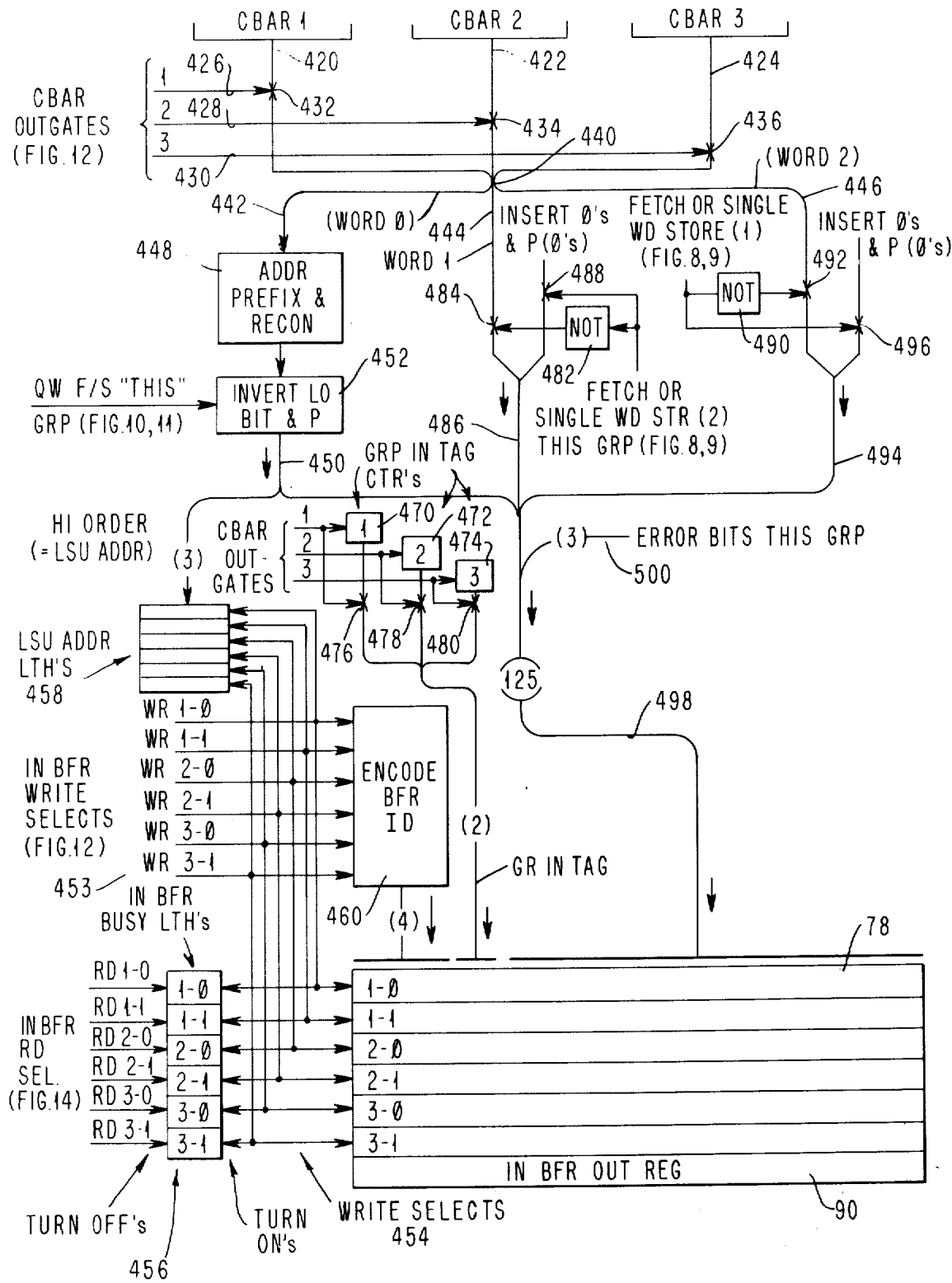
FIG. 14 shows data flow connections between the CBAR's and In Buffer illustrating the generation and insertion of Buffer ID tag and Group In tag functions, and insertion of zero filler words with "valid" partly into "idle" word paths (e.g., paths not used in a single-word store operation)

The data flow and logical gating for transfers from the CBAR to the In Buffer sections is indicated in FIG. 14. Outputs of CBAR 1, 2 and 3 are indicated respectively at 420, 422 and 424. Respective CBAR outgate control lines (from FIG. 12) are indicated at 426, 428 and 430. Respective gates are suggested at 432, 434 and 436. The gated CBAR output passes to a common path three words wide indicated at 440. This path branches into one-word-wide sections 442, 444 and 446 associated with outputs from respective word 0, word 1 and word 2 segments of the selected CBAR.

In section 442 the address part of the outgated request word is processed by translation (address prefix and reconfiguration) circuits 448 which derive auxiliary address bits from the fixed address bit and certain high order bits of the outgated address. The auxiliary bits are susceptible of being used by the SCE 5 (FIG. 1) to bypass defective storage modules in processor storage. This array and the associated bypass function form no part of the present invention and are shown only to complete the environmental description.

The request together with the auxiliary address (prefix and reconfiguration) bits pass to continuation path 450. In passage to path 450 a low order address bit and the parity of a respective low order address byte are conditionally inverted by logic 452. Inversion occurs when the outgated request unit is the second unit of a quad-word fetch or store (refer to FIGS. 6, 10 and 11).

The In Buffer write selection functions (FIG. 12) are applied via lines 453 to respective In Buffer section write-select inputs indicated at 454. These same functions are used to set respective In Buffer latches 456 to busy states (see also FIG. 13). These functions are used also to select respective LSU address latches indicated at 458 to hold three of the address bits on continuation path 450 (for purposes described later). Encoder 460 translates the position of the write-selection line which is currently effective into a Buffer ID tag (three bits plus parity). This tag designates the position of the write-selected In Buffer section and is stored in that section to be used to control output flow as described later.

Two-bit Group In Tag counters 470, 472 and 474, associated with outgated traffic of respective group CBAR's 1, 2 and 3, are respectively stepped after the respective CBAR is outgated. The successive count values in each counter thereby relate (Modulo 4) to the sequence of entry of request units of the respective group into the respective In Buffer area. Gates suggested at 476, 478 and 480 are operated by respective "CBAR Outgates" to pass a count value to the selected In Buffer section in association with the respective outgated request unit. The count value thereby stored in the In Buffer (termed Group in Tag value) indicates the sequence of entry of the associated request unit into the CBC (relative to other units of the same group). The stored In Tag is used to control ordering of output returns to the respective channel group in a manner described later.

Outgated data/mark/parity information in path 444 is handled as follows. If the request is for an operation other than a fetch (indicated by latch 302 FIG. 8 or latch 312 FIG. 10) or a singleword store associated with a D2 tag (indicated by latch 306, FIG. 9), NOT circuit 482 enables gate 484 to pass information from path 444 to continuation path 486.

If the operation is a fetch, or a singleword store associated with a D2 tag (indicated by latch 306, FIG. 9), gates 488 transfer filler zeros and associated parity to continuation path 486 and gates 484 are disabled.

Path section 446 is treated similarly. If the request is for other than a fetch or a singlword store associated with a D1 tag (indicated by latch 304, FIG. 9) NOT circuit 490 enables gates 492 to connect path 446 to continuation path 494. If the request is for a fetch, or a singleword store associated with a D1 tag, filler zeros and associated parity are inserted into continuation path 494 via gates 496.

Continuation paths 450, 486 and 494 merge into a 125-bit wide path 498 which also receives three "error bits", associated with the outgated CBAR group, from a source indicated at 500. These error bits, indicating results of not-shown CBAR parity checks, and the associated checks, form no part of the present invention. The information on bus 498 is stored in the write-selected section of In Buffer 78 in association with the Buffer ID and Group In tags discussed above.

Output/Read Selection Of The In Buffer

Figure 16:
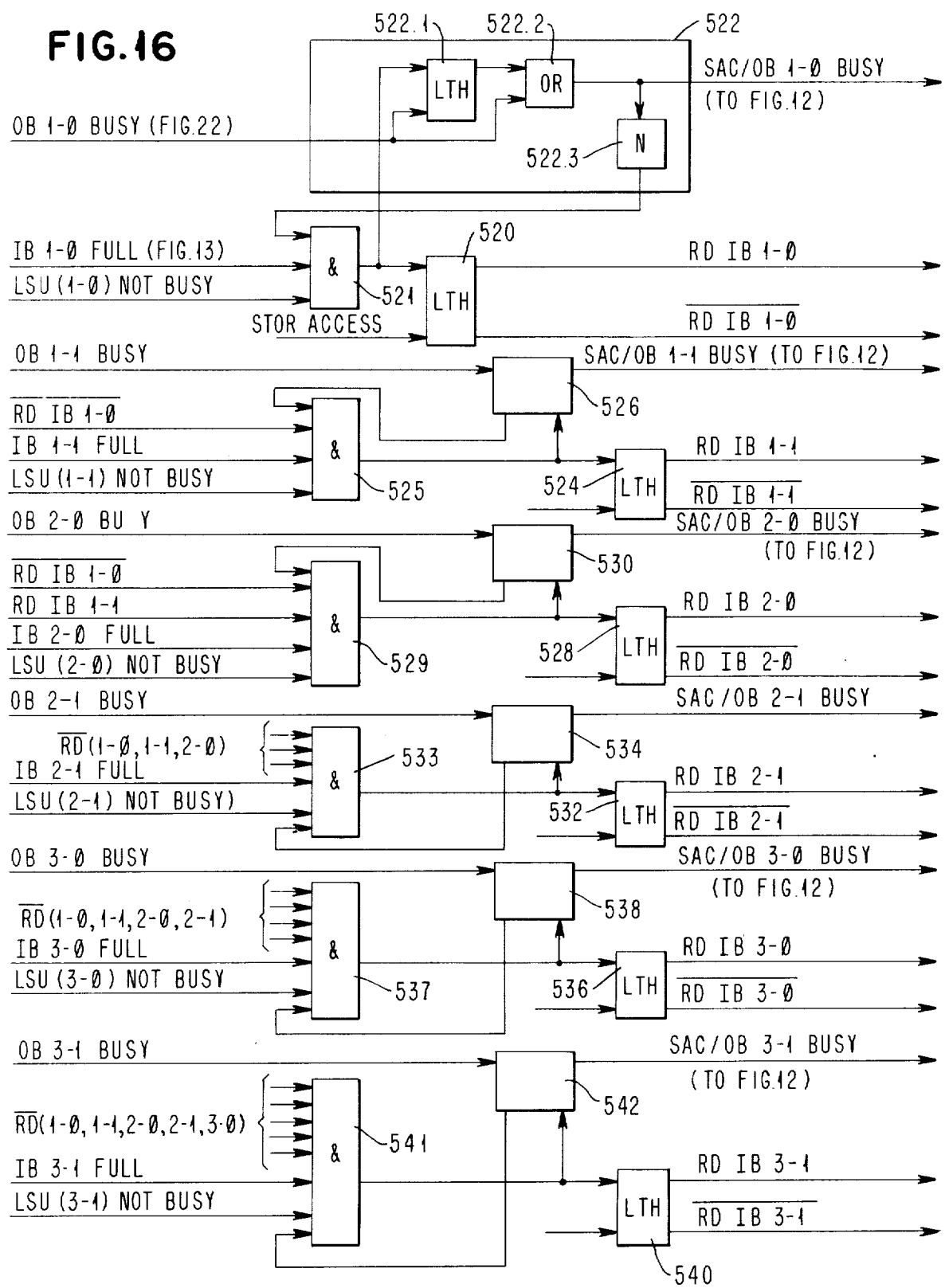

FIGS. 15, 16 and 18 indicate read-out from In Buffer 78. FIG. 15 shows read-selection logic 510, in a generalized block form, for selecting the next section of In Buffer 78 to read out into Out Reg 90 (FIGS. 3 and 18), and thereby into processor storage. Logic 510 receives Out Buffer busy indications (from FIG. 22) at 512 and uses the three-bit partial addresses (e.g., from latches 458, FIG. 14) at 514 to select LSU Busy indications 516. The partial addresses designate respective LSU (for Logical Storage Unit) storage modules containing the storage locations effectively designated by respective complete addresses held in respective sections of the In Buffer sections.

Figure 1:
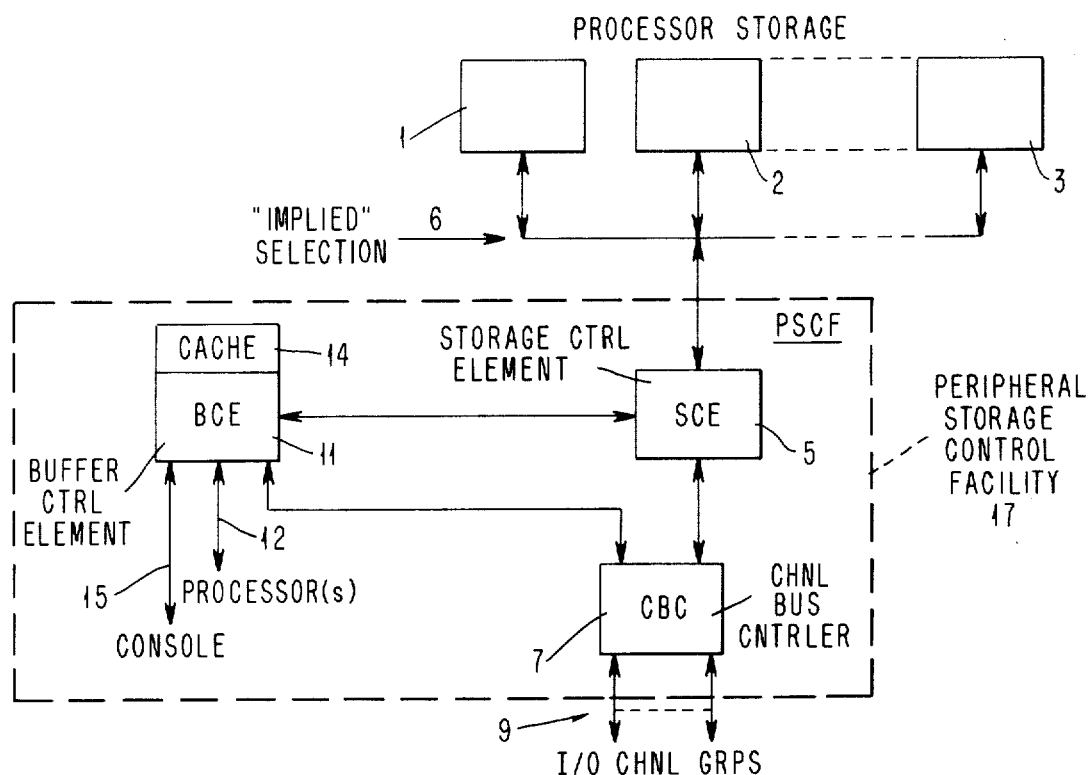
FIG. 1 shows the organizational environment in which the subject channel bus controller (CBC) operates.

LSU busy indications at 516 are furnished by the SCE 5 (FIG. 1). There is one input for each of the (n) LSU's. The number (n) depends upon the number of modules in processor storage. As previously stated such modules are arranged for access by the CBC and BCE 11 (FIG. 1) in interleaved mode.

Logic 510 operates to read-select the highest priority busy section of the In Buffer which corresponds positionally to a vacant Out Buffer section and contains an address designating a location in a non-busy LSU module.

Relevant details of logic 510 are shown in FIG. 16. Latch 520 is set by operation of AND circuit 521 which responds to coincidence of "In Buffer 1-0 full" (from FIG. 13), LSU (1-0) not busy (which reads "LSU addressed by address in In Buffer 1-0 not busy") and output from circuit 522 described below (which indicates Out Buffer 1-0 is vacant and not about to be filled). Latch 520 set (RD IB 1-0) permits readout of In Buffer 1-0 to Out Reg. 90.

Latch 524 is set by AND circuit 525 which responds to coincidence of: NOT RD IB 1-0 (higher priority Latch 520 not set), In Buffer 1-1 full (from FIG. 13), output from circuit 526 described below and LSU associated with contents of In Buffer 1-1 not busy. Latch 524 set (RD IB 1-1) permits readout of In Buffer 1-1 to Out Reg 90.

Latch 528 is set by AND circuit 529 which responds to coincidence of In Buffers 1-0 and 1-1 not selected (higher priority Latches 520 and 524 not set), In Buffer 2-0 full (from FIG. 13), output from circuit 530 described below and LSU associated with contents of In Buffer 2-0 not busy. Latch 528 set (RD IB 2-0) permits readout of In Buffer 2-0 to Out Reg. 90.

Latch 532 is set by AND circuit 533 which responds to coincidence of In Buffers 1-0, 1-1 and 2-0 not selected (higher priority Latches 520, 524 and 528 not set), In Buffer 2-1 full (from FIG. 13), output from circuit 534 described below and LSU associated with contents of In Buffer 2-1 not busy. Latch 532 set (RD IB 2-1) permits readout of In Buffer 2-1.

Latch 536 is set (RD IB 3-0), permitting readout of In Buffer 3-0, by AND 537 which responds to non-selection of all higher priority In Buffer sections 1-0, 1-1, 2-0 and 2-1 (latches 520, 524, 528 and 532 all not set) coincident with In Buffer 3-0 full (from FIG. 13), output from circuits 538 described below and LSU associated with contents of 3-0 not busy.

Latch 540 is set, to permit read-selection of In Buffer 3-1 (RD IB 3-1), by AND circuit 541 which responds to non-selection of any other section of the In Buffer (latches 520, 524, 528, 532 and 536 all not set) coincident with In Buffer 3-1 full (from FIG. 13), output from circuit 542 described below and LSU associated with contents of 3-1 not busy.

One of the foregoing latches (520, 524, 528, 532, 536 or 540) is set by exclusive operation of the respective AND circuit (521, 525, 529, 533, 537 or 541), thereby selecting a respective section of the In Buffer (1-0, 1-1, 2-0, 2-1, 3-0 or 3-1) for readout. That latch remains set until Out Reg 90 (FIGS. 3, 18) has been outgated to storage.

Logic circuits 522, 526, 530, 534, 538 and 542 are all identical internally. Hence details only of circuit 522 are given.

Circuit 522 comprises latch 522.1, OR circuit 522.2 and inverter (NOT) 522.3. Latch 522.1 is set when latch 520 is set and reset by "Out Buffer 1-0 Busy" (from FIG. 22). Set condition of latch 522.1 indicates "storage access in progress for section 1-0" (abbreviated SAC 1-0). Operation of OR 522.2 produces output SAC/OB 1-0 Busy (abbreviation for "SAC 1-0 or Out Buffer 1-0 Busy") from circuit 522. This output is applied to write-selection circuit 336 in FIG. 12.

Output from NOT 522.3 thereby indicates that an LSU storage access is not in progress relative to section 1-0 and Out Buffer 1-0 is not busy. This output is applied to AND 521 so that section 1-0 of the In Buffer is selected for readout only when the storage LSU for that section and Out Buffer section 1-0 are coincidentally accessible.

Circuits 526, 530, 534, 538 and 532 provide corresponding outputs relative to respective In Buffer sections 1-1, 2-0, 2-1, 3-0 and 3-1.

Inputs LSU Not Busy to AND's 521, 525, 529, 533, 537 and 541 are developed as follows. The LSU addresses in latches 458 (FIG. 14) correspond to the LSU addresses in respective occupied sections of the In Buffer. Each such latched LSU address is decoded (by not-shown decoding circuits) and used to select the availability indication (Busy - Not Busy) of the associated LSU module designated by the respective address. The selected indication is applied to the respective AND (521, 525, 529, 533, 537 or 541) associated with the In Buffer section containing the same address.

In Buffer Input Timing

FIG. 17 shows In Buffer write-in timing relative to the lowest priority CBAR 3. Corresponding operations relative to CBAR 1 and CBAR 2 will be apparent. "XMIT ENABLE 3" is active if either CBAR 3 is not busy or In Buffer 3-0 or 3-1 is not busy (and drops only if CBAR 3 becomes busy while In Buffer sections 3-0 and 3-1 are both busy). "EOT 3" from Director 3 conditions CBAR 3 to busy. CBAR 3 is outgated (and In Buffer 3-0 or 3-1 is written into) either immediately or within the next two CBC cycles depending on the activity in the higher priority CBAR's 1 and 2. The "earliest" next transmission from Director 3, shown at 546, occurs two director cycles (four CBC cycles) after EOT 3, leaving a margin of time 548 relative to the "latest" point of transfer out of CBAR 3.

In Buffer Output Data Flow

FIG. 18 indicates at 550 that outgating of Out Reg 90 transfers address, key, data and mark information (or zero fillers in the data and mark positions) to processor storage for completing the requested operation. The address information includes the operation bit (S) which indicates whether the operation is a store or a fetch. For a fetch operation the storage controls 5 (FIG. 1) use the address to retrieve two words of data. For a store (READ) operation the controls 5 use the address and marks to place the accompanying data in a doubleword space in storage. The mark bits indicate respective data bytes to be stored contiguously.

The Buffer ID tag, Group In tag and Channel ID tag information pass into the source/sink chain 100 at 552 in association with the transfer of respective information to storage at 550. One of the four Channel ID tag bits is dropped in this transfer. Of the four original Channel ID tag bits one is normally always zero (carried along only for parity/line check usage not relevant to the present invention). The other three bits designate one of the up to six channels comprising the respective group.

The normally zero bit is dropped in the source/sink transfer.

Storage Timing

In a preferred embodiment the CBC cycle is slightly less than 60 ns (nanoseconds). The CBC input buffer is susceptible of being written into in each cycle and read out in each cycle. Storage LSU's in the same embodiment are each accessible at intervals of about 300 ns, in interleaved mode. The probability of blockage in this situation is virtually negligible. Hence each input buffer area has virtually continuous access to storage. Hence each Transmit Enable line is usually active continuously (except for those relatively infrequent instances when a CBAR becomes busy while the associated In Buffer area is full).

Out Buffer Input

Referring to FIG. 19 tag entries in source/sink chain 100 are presented at output 560 in the order of their entry into the chain (i.e., in the order of emergence of associated storage outputs from processor storage at 562). Storage outputs consist either of acknowledgments of execution of store requests or data retrieved in response to fetch requests. The section of Out Buffer 106 selected for write-in from storage is determined by write-selection circuit 564. This circuit decodes the buffer ID tag exiting from the source/sink chain at 566 and thereby selects the section corresponding positionally to the In Buffer section which held the corresponding request.

Figure 22:
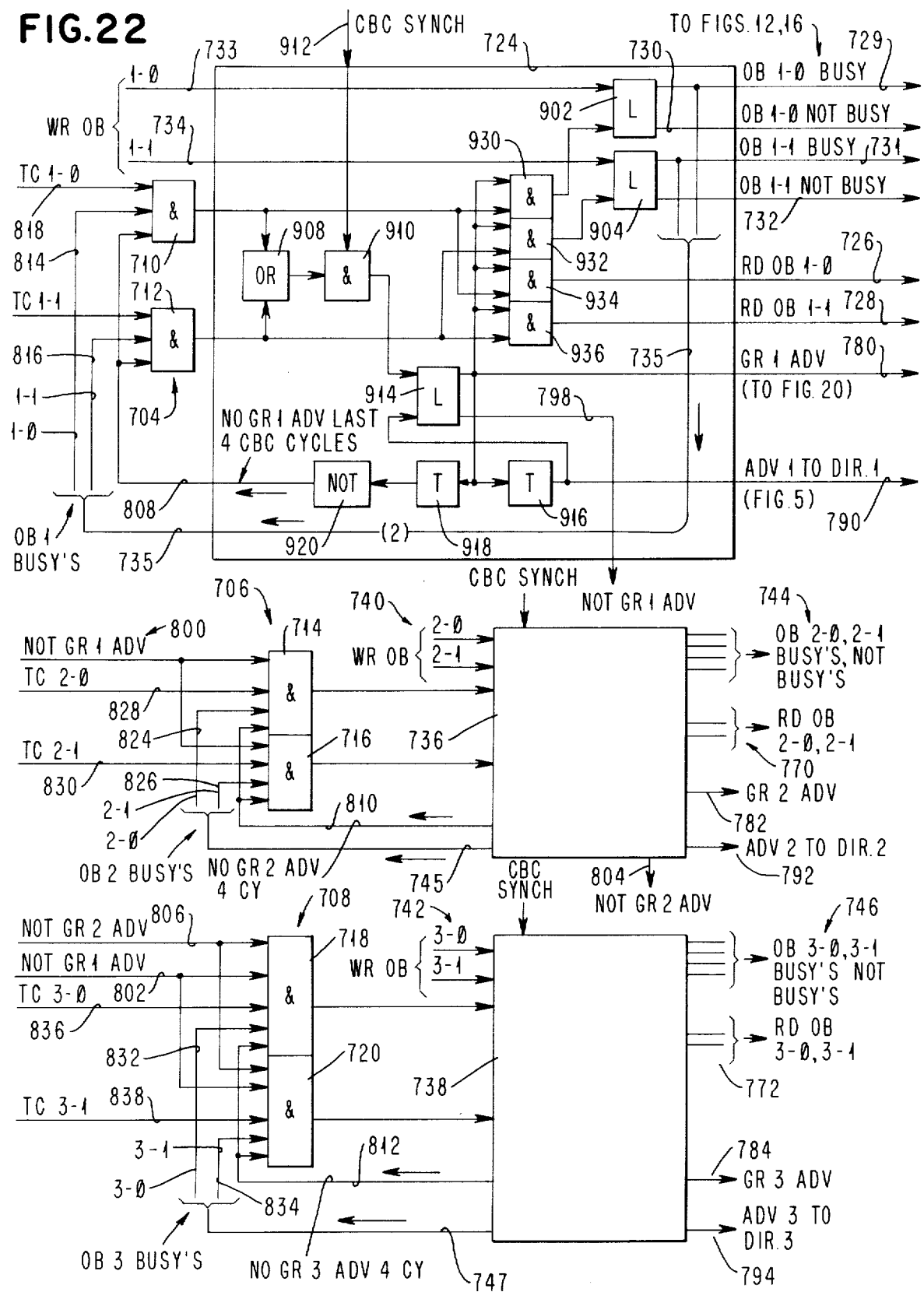

The read-selection of Out Buffer sections is determined by read-selection logic 568 detailed in FIGS. 21 and 22. Out Buffer read-selection operates on the principle that the section selected will be the highest priority "full" section "eligible" to be transferred out. Eligibility is determined on the basis of a comparison (FIG. 21) between the Group In tags from the source/sink chain and associated Group Out tags. In effect a section becomes "eligible" if its group has priority and its contents are associated with the "oldest" request of the group for which the CBC output has not been transferred to that group. Consequently outputs to each channel group always leave the CBC in an order corresponding to the input order of respective requests from the group; regardless of the order in which such requests are applied to storage, and regardless of which In Buffer sections such requests occupied.

Source/Sink Flow

Figure 20:
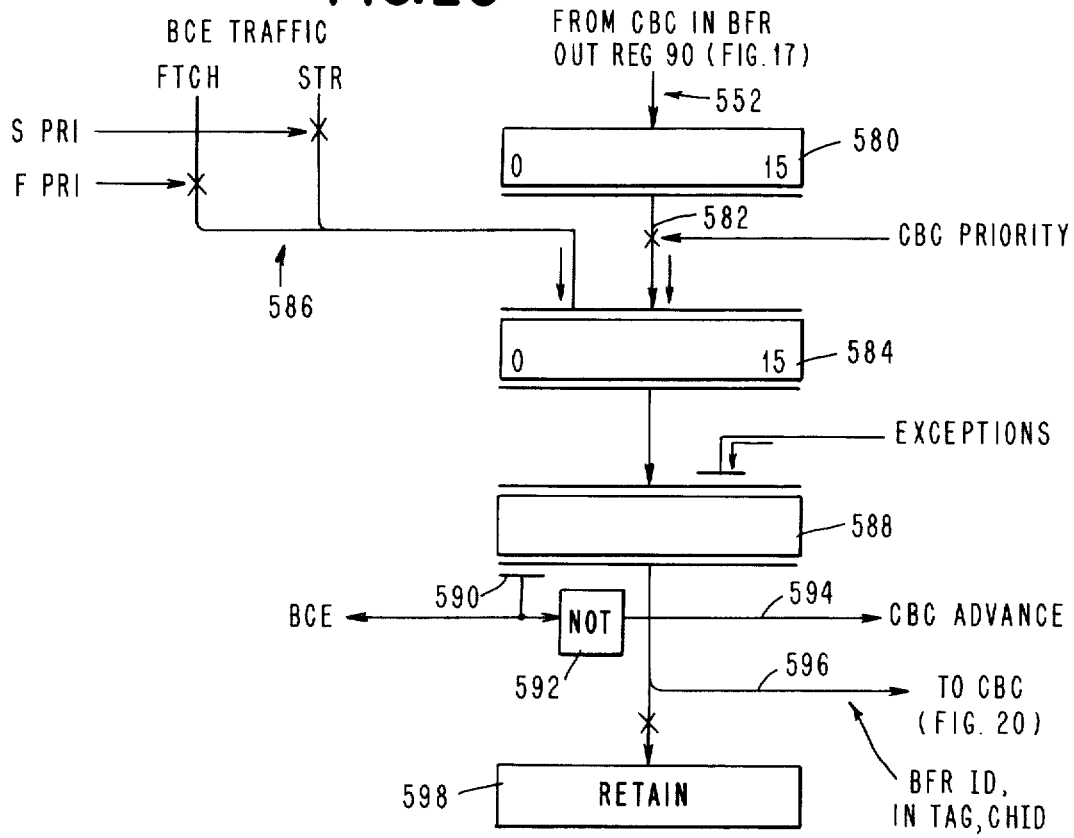
FIG. 20 shows relevant parts of the source/sink queue.

FIG. 20 shows the organization of source/sink 100. The source/sink is essentially a parallel shift array operating in time coordination with the timing of respective storage access operations. The array is sixteen bits wide to accommodate more than the ten bits of tag and parity information transferred from the CBC. Only one of these additional bits, an "advance" bit, is of interest in respect to the subject invention. Hence only that bit will be considered below.

The output tags from the CBC enter the first shift register stage 580 of the source/sink at 552 and later pass through gates 582 to the next register stage 584. Gates 582 are operated when a storage operation is in process relative to the CBC ("CBC priority"). Register 584 receives BCE tags at 586 when a storage operation (store or fetch) in behalf of BCE 11 (FIG. 1) is in process. BCE inputs to the source/sink chain are not relevant to the present invention and are shown only for the sake of indicating the competitive environment of usage of the source/sink relative to the CBC; such environment corresponding to the competitive environment of usage of processor storage.

Output of register 584 passes to register 588 along with presently non-relevant exception (error) bits. The content of register 588 is made available in time coordination with the outflow of corresponding information from storage.

The Advance bit gated out of register 588 at 590 distinguishes BCE storage operations from CBC operations. If this bit is a "1" the BCE receives an Advance signal. If the bit is a "0" it is inverted by NOT circuit 592 and presented as an advance signal to the CBC on line 594. With each advance to the CBC the associated tags (Buffer ID, In Tag, Channel ID) are transferred to the CBC via separate buses indicated collectively at 596.

The output of register 588 is also retained in register 598.

Input To Out Buffer

Input to Out Buffer 106 is shown in FIG. 21. The Channel ID information (from source/sink output bus 596, FIG. 20) enters the Out Buffer via input bus 560 and is stored in association with the storage output received on input bus 562. Write-in selection of an Out Buffer section is controlled by the Buffer ID tag information received at 600 (from source/sink output bus 596, FIG. 20) and timed relative to the CBC advance signal received at 594 (from corresponding line 594, FIG. 20). The Buffer ID tag is stored in a three-bit register 604. The CBC advance indication is retained in latch 606.

At a predetermined time after the setting of latch 606 trigger circuit 608 stimulates line 610 enabling gates 612 to pass the Buffer ID tag from register 604 to decoder 614. The corresponding output of decoder 614 provides write-selection control via lines 616 to a corresponding section of Out Buffer array 106; thereby storing the Channel ID and storage output information in the Out Buffer section which corresponds positionally to the In Buffer section in which the associated request was held.

After an appropriate delay shown schematically at 618 latch 606 is reset terminating the write-in operation and permitting the Out Buffer to be accessed for readout. The write-selection output lines from decoder 614 also extend via lines 619 to Out Buffer Busy latches (FIG. 22) and via lines 620 to respective input lines 622–627 of Tag Compare circuits 630, 632 and 634 discussed next.

Out Buffer Readout

The two bits of In Tag information (from source/sink output 596, FIG. 20) are received at 635 (FIG. 21) and applied to each Tag Compare circuit 630, 632 and 634 (FIG. 21). Circuits 630, 632 and 634 are internally identical and details of each will be described by reference only to details of circuit 630.

Circuit 630 receives a "Group 1 Advance" input at 636 (from read-selection circuits of FIG. 22). Circuit 632 receives a Group 2 Advance input at 638 (from read controls of FIG. 22). Circuit 634 receives a Group 3 Advance input at 640 (from read controls of FIG. 22).

Circuit 630 provides compare output signals TC 1-0 and TC 1-1 at 642 and 643 respectively which are transferred to respective read-selection circuits in FIG. 22. Circuit 632 produces Tag Compare outputs TC 2-0 and TC 2-1 at 644 and 645 respectively which are transferred to respective read-selection circuits in FIG. 22. Circuit 634 produces Tag Compare outputs TC 3-0 and TC 3-1 at 646 and 647 respectively which are transferred to respective read-selection circuits in FIG. 22.

While section 1-0 or 1-1 in the Out Buffer is being written a write-selection input to circuits 630 on a respective line 622 or 623 controls a respective gate 650 or 652, in a respective path of the Group In Tag input from lines 635 to a respective two-bit register 654 or 656. Circuits 632 contain corresponding pairs of gates and In Tag registers operative when a respective Out Buffer section 2-0 or 2-1 is being written. Circuits 634 contain corresponding elements operative when a respective Out Buffer section 3-0 or 3-1 is being written.

Two-bit compare circuits 658 and 660 are connected between respective registers, 654 and 656, and an Out Tag counter 662. Counter 662 is stepped by Group 1 Advance (from FIG. 22) when information is read out from a respective section, 1-0 or 1-1, of the Out Buffer (to Director 1 via Out Buffer Out register 116; see FIG. 19).

Out Tag counter 662 is initialized in correspondence to the initial state of the respective Group In Tag counter 470 (FIG. 14) and advanced (stepped) by Group 1 advance when a Group 1 output transfer occurs. A match (tag compare) indication, TC 1-0 or TC 1-1, is produced by the respective compare circuit, 658 or 660, only when the associated In Tag (in 654 or 656) matches the Out Tag value in counter 662; i.e., only when information currently occupying the respective Out Buffer section, 1-0 or 1-1, represents the response to the oldest Group 1 request for which a response to Director 1 has not been sent from the CBC.

More particularly, In Tag values entered into registers 654 and 656 represent the relative order of entry into the CBC of requests associated with contents of respective sections 1-0 and 1-1; since these values are developed in the sequence: 00, 01, 10, 11, . . . by the sequential counter 470 (FIG. 14).

Assume, for instance, that two Group 1 requests R1, R2 are received by the CBC in the order first R1 then R2, and stored respectively in In Buffer sections 1-1 and 1-0. Suppose for instance that such requests are applied to storage in the order R2 first then R1. The storage response to R2 would be produced first and written into Out Buffer 1-0. The later response to the earlier request R1 would be entered in Out Buffer 1-1.

However, the In Tag value accompanying the response to R2 would have a higher value (Modulo 4) than the In Tag value accompanying the later response to R1. Consequently the count value in Out Tag counter 662 could not match the value associated with R2 until it had first matched the lower value associated with R1; since the count 662 advances progressively with successive Group 1 outputs (GR 1 ADV), in the sequence: 00, 01, 10, 11, 00, . . .

Consequently compare circuit 658 would operate in this instance only after the Out Tag counter had been stepped in response to readout of Out Buffer 1-1 (while the "earlier" storage output is "held up" in Out Buffer 1-0).

Consider further the following tabulated example where: (a) R1, R2, R3, R4 represent Group 1 storage requests received successively by the CBC; (b) entries "—" represent "don't care's"; (c) entries "0/ . . ." represent "storage output associated with . . ."; and (d) successive entry rows represent buffer contents at progressively later stages of CBC operation.

| Buffer Contents | | | | Assoc In Tag | |
|---|---|---|---|---|---|
| IB 1-0 | IB 1-1 | OB 1-0 | OB 1-1 | OB 1-0 | OB 1-1 |
| R1 | — | — | — | — | — |
| R1 | R2 | — | — | — | — |
| R1 | R3 | — | 0/R2 | — | 01 |
| R4 | R3 | 0/R1 | 0/R2 | 00 | 01 |
| — | R3 | 0/R4 | 0/R2 | 11 | 01 |

Note that the situation indicated in the last row could arise because the sequence of request access to storage is variable (dependent only on the availability of the associated LSU and the associated Out Buffer section).

Note further that the In tag values in the last row have identical low order bits (1's) but different high order bits (1 associated with OB 1-0; 0 associated with 1-1), whence it should be appreciated that an In Tag consisting of a single bit would be inadequate to distinguish one Out Buffer section to select for readout without ambiguity. By induction it may be appreciated that if the Out Buffer had $n$ sections per group ($n > 2$), the number of In Tag bits could be $m$ where $2^m > n$.

Circuits 632 contain compare circuits corresponding to circuits 658 and 660, and a Group 2 Out Tag counter corresponding to counter 662, which operate analogously relative to Out Buffer sections 2-0 and 2-1. Circuits 634 likewise contain compare and Out Tag elements operating in an analogous manner relative to Out Buffer sections 3-0 and 3-1.

The tag compare outputs of circuits 630, 632 and 634 (TC 1-0, 1-1, 2-0, 2-1, 3-1) are utilized in association with Out Buffer busy indications and in association with other conditions discussed below, to resolve priority and select the next section of the Out Buffer to read out. Readout (Group Advance) is timed to occur only when the Out Buffer is not being written. Readout-selection is shown in FIG. 22.

Pairs of AND circuits, indicated generally at 704, 706 and 708, provide priority selection relative to respective Out Buffer areas 108, 110 and 112 (FIG. 3) associated with channel Groups 1, 2 and 3 respectively. These pairs of AND circuits resolve priority in the sequence of respective groups (1, 2, 3) when the respective group area is occupied and other output eligibility conditions are met.

AND circuit pair 704 consists of individual AND circuits 710 and 712 associated respectively with readout-selection of Out Buffer sections 1-0 and 1-1. AND circuit pair 706 consists of individual AND circuits 714 and 716 associated with selection of Out Buffer sections 2-0 and 2-1 respectively. AND circuit pair 708 consists of individual AND circuits 718 and 720 associated with readout-selection of Out Buffer sections 3-0 and 3-1 respectively.

Circuits 724 interact with AND circuit pair 704 to provide read-selection control to Out Buffer sections 1-0 and 1-1. Such selection (RD OB 1-0, 1-1) is provided via output lines 726 and 728 respectively. Lines 726 and 728 connect to the Out Buffer via respective lines in the set of lines indicated collectively by RD OB in FIG. 21.

Circuits 724 also manifest busy and not busy conditions of respective Out Buffer sections at 729, 730, 731 and 732 in response to respective Out Buffer write-selection inputs received at 733 and 734. Storage access (SAC) functions SAC 1-0, SAC 1-1 (FIG. 16) and busy functions at 729 and 731 (OB 1-0 Busy, OB 1-1 Busy) are also utilized by respective In Buffer write-selection circuits 336 (FIG. 12) discussed previously. The busy functions at 729 and 731 are also applied as inputs to respective AND circuits 710 and 712 of pair 704 via lines collectively indicated at 735. The busy functions at 729 and 731 and inverse SAC functions (FIG. 16) are utilized by previously discussed In Buffer read-selection AND circuits 521, 525 (FIG. 16).

Circuits 736 and 738, internally identical to circuits 724, perform corresponding functions relative to respective In Buffer and Out Buffer areas associated with traffic to Groups 2 and 3. AND circuit pair 706 associated with circuit 736 is conditioned so that respective Out Buffer sections, 2-0 and 2-1, are eligible for readout-selection only if no higher priority section, 1-0 or 1-1, is currently selected (NOT GR 1 ADV). Conditioning of AND circuit 708, associated with circuit 738, permits read-selection of respective Group 3 Out Buffer sections, 3-0 and 3-1, only if no higher priority section (1-0, 1-1, 2-0 or 2-1) is currently selected (NOT GR 1 ADV and NOT GR 2 ADV).

Write-selection functions are applied to circuits 736 at 740 (WR OB 2-0 and 2-1). The SAC/OB 2-0 and 2-1 functions are also utilized by respective In Buffer write-selection circuits 338 (FIG. 12).

Write-selection functions are applied to circuits 738 at 742 (WR OB 3-0 and 3-1). The SAC/OB 3-0 and 3-1 functions are also applied to respective In Buffer write-selection circuits 340 (FIG. 12).

Busy outputs of circuits 736 at 744 combined with respective SAC functions (FIG. 16) are utilized by respective In Buffer write-selection circuits 338 (FIG. 12). Busy outputs of circuits 736 at 744 are also applied to respective AND circuits 714 and 716 of pair 706 via line 745.

Busy outputs of circuits 738 at 746 are combined with respective SAC outputs (FIG. 16) and applied to respective In Buffer write-selection circuits 340 (FIG. 12). Busy outputs of circuits 738 and 746 are also applied to respective AND circuits 718 and 720 of pair 708 via line 747.

Circuits 736 and 738 provide read-selection control outputs, at 770 and 772 respectively, to respective Out Buffer sections via lines collectively indicated by RD OB in FIG. 21. Outputs 770 control selection of Out Buffers 2-0 and 2-1. Outputs 772 control selection of Out Buffers 3-0 and 3-1.

Circuits 724, 736 and 738 provide respective Group Advance outputs at 780, 782 and 784 respectively, Group 1 Advance at 780 steps Out Tag counter 662 (FIG. 21) in Tag Compare circuits 630 (FIG. 21). Group 2 Advance at 782 increments the corresponding Group 2 Out Tag counter in Tag Compare circuits 632 (FIG. 21). Group 3 Advance at 784 increments the corresponding Group 3 Out Tag counter in Tag Compare circuits 634 (FIG. 21).

Circuits 724, 736 and 738 provide respective Advance 1, 2 and 3 signals to respective Directors 1, 2 and 3 at respective outputs 790, 792 and 794. These prepare the respective Directors to receive associated transfers on the output bus.

Circuits 724 provide the inverse of Group 1 Advance (NOT Group 1 Advance) at 798 as priority enabling inputs to AND circuits 706 and 708 at 800 and 802 respectively. Circuits 736 provide the inverse of Group 2 Advance (NOT Group 2 Advance) at 804 as priority enabling input to AND's 708 at 806.

AND circuit pairs 704, 706 and 708 are responsive to respective conditioning inputs to prepare one of the respective circuits 724, 736 or 738 to issue its respective Group Advance (1, 2 or 3) and Director Advance (1, 2 or 3).

AND circuit pairs 704, 706 and 708 are prepared by outputs of respective circuits 724, 736 and 738, at 808, 810 and 812 respectively; such outputs indicating that a respective Group Advance (1, 2, 3) has not been issued during the last four CBC cycles. This prevents traffic of any one group from pre-empting the shared output bus to the Directors and also limits the rate of output transfer to each Director.

AND circuits 710 and 712, constituting pair 704, are individually conditioned by respective OB Busy inputs (1-0 and 1-1) at 814 and 816, and by respective Tag Compare inputs (TC 1-0 and 1-1) at 818 and 820 from Tag Compare circuits 630 (FIG. 21). Tag Compares TC 1-0 and 1-1 are mutually exclusive since only one of the Compare circuits 658 and 660 (FIG. 21) can detect a match at any time. Consequently operations of AND circuits 710 and 712 are mutually exclusive (in time). Hence only one of these circuits will be operated (preparing circuit 724 for issuance of Group 1 Advance) when the respective Tag Compare and OB Busy inputs are active and a Group 1 Advance has not been generated during the four preceding CBC clock cycles.

AND circuits 714 and 716, constituting pair 706, are individually conditioned by respective OB Busy inputs (2-0 and 2-1 at 824 and 826, and by respective Tag Compare inputs (TC 2-0 and TC 2-1) at 828 and 830 from Tag Compare circuits 632 (FIG. 21). Hence a unique one of AND circuits 714 and 716 will be operated when: (a) the respective OB Busy and Tag Compare inputs are active; (b) the associated Group 2 Advance has not been generated during the four proceding CBC cycles; and (c) higher priority Group 1 Advance is currently inactive.

AND circuits 718 and 720, constituting pair 708, are individually conditioned by respective OB Busy inputs (3-0 and 3-1) at 832 and 834, and by respective Tag Compare inputs (TC 3-0 and TC 3-1) at 836 and 838, from Tag Compare circuits 634 (FIG. 21). Hence one of the AND circuits 718 or 720 will be operated when: (a) the respective OB Busy and Tag Compare inputs are active; (b) the associated Group 3 Advance has not been generated for four CBC cycles; and (c) higher priority Group 1 Advance and Group 2 Advance are both currently inactive.

Circuits 724 comprise latches 902 and 904 for manifesting Busy states of respective Out Buffer sections 1-0 and 1-1 at 729 and 731. Latch 902 is set by "WR OB 1-0" input at 733 when information is written into Out Buffer 1-0. Latch 904 is set by "WR OB 1-1" input at 734 when information is written into Out Buffer 1-1. Circuits 736 contain corresponding latches for manifesting OB 2-0, 2-1 Busy's at 744. Circuits 738 contain corresponding latches for manifesting OB 3-0, 3-1 Busy's at 746.

Operation of OR circuit 908, in response to operation of either AND circuit 710 or 712, prepares AND circuit 910. When prepared AND 910 responds to CBC synchronizing reference at 912 to set latch 914 which manifests Group 1 Advance at 780. Set conditioning of latch 914 stimulates delay trigger circuit 916 to manifest Advance 1 to Director 1 at 790 after a predetermined delay of at least one CBC cycle, and to reset latch 914. Set conditioning of latch 914 also stimulates delay trigger circuit 918 to operate one CBC cycle after setting of latch 914 and to stay operated for three CBC cycles. Output of circuit 918 is inverted by NOT circuit 920, output of which thereby becomes disabling relative to AND's 704 for three CBC cycles. Such disablement is thereby effective for four cycles relative to repeat setting of latch 914 (which is not reset for at least one cycle). Reset state of latch 914 is manifested as NOT Group 1 Advance at 798.

Elements in circuit 936, corresponding to latch 914, pulse generating circuits 916 and 918, and inverter 920, provide respective Group 2 outputs: Group 2 Advance (at 782), Advance 2 to Director 2 (at 792), "NO GR 2 Advance 4 cycles" ( to AND's 714 and 716 at 810), and NOT Group 2 Advance (at 804).

Elements in circuits 938 corresponding to latch 914, pulse generating circuits 916 and 918, and inverter 920 provide respective Group 3 outputs: Group 3 Advance (at 784), Advance 3 to Director 3 (at 794), and "NO GR 3 ADV 4 cycles" (to AND's 708 at 812). NOT Group 3 Advance output is not required since circuit 738 has lowest (Group 3) priority.

Latch 914 in circuits 724 prepares AND circuits 930, 932, 934 and 936. When prepared AND circuits 930 and 932 respond to operations of respective AND circuits 710 and 712, and reset respective latches 902 and 904 to "NOT Busy" status. When prepared AND circuits 934 and 936 respond to operations of respective AND circuits 710 and 712, and generate respective read-selection stimuli at 726 and 728 for reading out respective Out Buffer sections 1-0 and 1-1.

Circuits 736 and 738 condition elements corresponding to AND's 930, 932, 934 and 936 for providing the corresponding Group 2 and 3 "NOT Busy" reset and read stimulation actions.

While the invention has been shown and described with reference to a particular embodiment thereof, it will be understood by those skilled in the art that changes in form and detail may be made therein without departing from the spirit and scope of the invention.

What is claimed is:

1. In a data processing system having a channel bus controller for transferring request information entities from multiple input/output channels to a shared processor store and for transferring response information entities associated with said request entities from said store to said channels, wherein said controller includes an input buffer having multiple positionally ordered spaces for storing said request entities in transit from said channels to said store, and an output buffer having multiple spaces corresponding to said input buffer spaces for storing said response entities in transit from said store to said channels, in combination:

means associated with said input buffer for providing tag entities in association with transfers of individual said request entities to said input buffer, said tag entities denoting the sequence of entry of the associated request entities into said input buffer;

means coupled to said input buffer for applying said request entities to said store in a sequence susceptible of differing from the sequence of entry of said request entities into said input buffer;

buffer means for retaining said tag entities after respective said request entities have been removed from said input buffer and applied to said store; and means associated with said tag entity retaining means for utilizing said retained tag entities to order the sequence of transfers of said response entities from said output buffer to said channels in correspondence with the sequence of entry of the associated request entities into said input buffer.

2. The combination according to claim 1 wherein:

each said tag entity comprises information designating the order of entry of the respective request entity into said input buffer relative to other request entities and the position of the space occupied by the respective request entity in said input buffer;

said request entities are transferable to said store in an order different from said order of entry; and said utilizing means comprises means responsive to said entry order designating information in said retained tag entities for determining said transfer sequence.

3. A combination according to claim 1 wherein each said tag entity comprises information designating the identity of a channel representing both the source of the respective request entry and the destination of the respective response entity; and said utilizing means comprises:

means for steering said channel identity information into said output buffer for storage in association with respective said response entities and for presentation thereby to said channels in association with respective response entities.

4. The combination according to claim 2 wherein said order designating information and said position designating information are in the form of discretely separate numerical representations.

5. The combination according to claim 4 wherein said order designating representations are numbers in a set of at least three distinctly different numbers.

6. The combination according to claim 5 wherein said utilizing means comprises:

means for concurrently generating plural separate output tag entities designating the order of removal of response entities from spaces in said output buffer for presentation to said channels;

means for concurrently comparing order designations in plural said retained tag entities to each said output tag entity; and means responsive to said comparisons for controlling the order of transfer of said response entities to said channels in correspondence with the order of entry of associated request entities to said input buffer.

7. The combination according to claim 3 wherein:

said channels are arranged in plural groups, each consisting of plural channels;

said channel identity information is furnished to the bus controller with requests of the respective group, retained by said tag retaining buffer means in association with the respective group request, passed to said output buffer in association with respective response entities of the respective group and eventually returned to the respective group with respective response entities; whereby the request and response entities of each group may be treated transparently, by said bus controller and store, effectively as communications relative to a single channel.

8. The combination according to claim 1, wherein said channels are arranged in plural discrete groups, each group comprising plural channels and having common controls for transferring request and response entities between respective channels of the group and said bus controller; said combination comprising:

plural input steering means associated with respective said channel groups, for steering request entities of the respective groups into separate sets of spaces in said input buffer reserved for the respective groups;

output steering means responsive to said retained tag entities for steering response entities associated with respective said groups into sets of spaces in said output buffer reserved for response entities of respective said groups; said sets of spaces in said input and output buffers corresponding positionally; said output steering means steering individual said response entities into spaces in the respective set of spaces in said output buffer which correspond to spaces in the input buffer occupied earlier by respective request entities.

9. A combination in accordance with claim 1 including:

means for presenting group enabling signals from said controller to groups of said channels, each group enabling signal permitting transfer of request entities from individual channels of the respective group to said bus controller in a quasi-asynchronous mode; whereby a succession of plural request entities may be sent from the respective group to said bus controller in response to continuous manifestation of the respective enabling signal without having to wait for intermediate acknowledgments of reception of individual said entities from said bus controller;

said input buffer containing sets of plural request entity storage spaces reserved for request entities of respective said groups;

means associated with said input buffer for distinguishing the occupancy status of each space in each said set of spaces in said input buffer; and means responsive to the collective occupancy status of spaces in each set for maintaining the associated enabling signal continuously effective relative to the associated group if any space in the respective set is unoccupied; the effectiveness of the associated enabling signal being terminated when all spaces in the respective set are occupied.

10. In a data processing system having a channel bus controller for transferring request input entities from multiple input/output channels to a shared processor store and for transferring response output information entities associated individually with said request entities from said store to said channels, wherein said store comprises logical storage unit modules accessible in interleaved mode and said bus controller comprises input and output buffer arrays, said input array having multiple positionally ordered spaces for storing respective said request entities en route to said store from said channels, said output buffer array having multiple positionally ordered spaces, positioned in corresondence with associated spaces in said input buffer array, for storing individual said response entities en route from said store to said channels; in combination:

plural registers associated with said bus controller and groups of said channels, each register associated with one group, each group comprising plural said channels, each register serving to store request entities communicated from the respective group, each request entity comprising a request element and a channel identity element, each request element comprising a storage address designating a specific said logical storage unit module and a specific location in said specific module, each channel identity element designating a specific channel of the respective group which represents the source of the respective request entity, each said register having an associated set of spaces in said input buffer uniquely reserved relative thereto, each space in each said set comprising first and second sub-spaces, each first sub-space being useful for storing a request entity, each second sub-space being useful for storing control information associated with a request entity in the first sub-space of the same space;

means for indicating occupancy status of each said register and each said space in said input buffer array;

means responsive to indications that one of said registers is occupied and that the associated set of spaces in the input buffer includes a vacant space for transferring a request entity from said one register to a first sub-space in a selected vacant space in the associated set of spaces in said input buffer;

means associated with said request entity transfer means for producing a tag entity associated with the transferred request entity, said tag entity comprising an order tag element and a position tag element, said order tag element designating the order of entry of the associated request entity into said input buffer array in relation to transfers of other request entities of the respective group into said array, said position tag element indicating the position of the selected vacant space receiving said associated request entity;

means for transferring said tag entity into the second sub-space of the selected vacant space in association with the transfer of the associated request entity into the first sub-space of the same space;

means for transferring request entities from occupied spaces in each set of spaces in said input buffer to said processor store modules, the transfers from any set occurring in a sequence susceptible of differing variably from the order of entry of request entities into said set of spaces as designated by respective said order tag elements;

source/sink buffer means for retaining the channel identity element and tag entity associated with each request entity transferred to said processor store;

steering means associated with said source/sink buffer means for steering each response entity produced by said store, together with the associated channel identity element provided by said source/sink buffer means, into a space in said output buffer corresponding to the space in said input buffer occupied earlier by the associated request entity; the spaces in said output buffer being organized thereby into sets corresponding to the sets in said input buffer; said steering means utilizing the associated position tag element provided by said source/sink buffer means for selecting said corresponding space in said output buffer; and means for utilizing the associated order tag elements provided by said source/sink buffer means for ordering the transmittal of response entities from any set of spaces in said output buffer to the associated group of channels in an order corresponding to the order of entry of respective request entries from said channels into the associated set of spaces in said input buffer.

11. The combination according to claim 10 including:
means for presenting enabling signals to each said group of channels permitting the respective group to forward request entities to the respective said register one at a time in a quasi-asynchronous mode; said mode characterized in that said request entities may be forwarded successively without the channel group having to wait for intermediate action by said bus controller acknowledging reception of individual entities; and
means associated with said occupancy indicating means for maintaining said enabling signals effective continuously relative to the associated group of channels while vacancy exists either in the respective associated register or in the associated set of spaces in the input buffer.

12. The combination according to claim 10 including:
auxiliary address buffer means associated with said means for transferring request entities from the registers to vacant input buffer spaces for retaining a part of each storage address in each transferred request entity, said address part designating the addressed logical storage unit module;
means responsive to the address parts in said auxiliary buffer means for determining the availability of respective storage unit modules for receiving respective request entities from said input buffer; and
means responsive to said availability determinations for ordering the sequence of access of presentation of request entities from each said set of input buffer spaces to said modules.

* * * * *